US012724037B2

(12) United States Patent
Tanaka

(10) Patent No.: US 12,724,037 B2
(45) Date of Patent: Sep. 1, 2026

(54) PHYSICAL QUANTITY SENSOR AND INERTIAL MEASUREMENT DEVICE

(71) Applicant: SEIKO EPSON CORPORATION, Tokyo (JP)

(72) Inventor: Satoru Tanaka, Chino (JP)

(73) Assignee: SEIKO EPSON CORPORATION (JP)

(*) Notice: Subject to any disclaimer, the term of this patent is extended or adjusted under 35 U.S.C. 154(b) by 302 days.

(21) Appl. No.: 18/483,626

(22) Filed: Oct. 10, 2023

(65) Prior Publication Data

US 2024/0118308 A1 Apr. 11, 2024

(30) Foreign Application Priority Data

Oct. 11, 2022 (JP) ................................ 2022-163048

(51) Int. Cl.
*G01P 15/125* (2006.01)
*G01P 15/08* (2006.01)

(52) U.S. Cl.
CPC .... *G01P 15/125* (2013.01); *G01P 2015/0831* (2013.01)

(58) Field of Classification Search
CPC .................................................... G01P 15/125
USPC ....................................................... 73/514.32
See application file for complete search history.

(56) References Cited

U.S. PATENT DOCUMENTS

2012/0297874 A1* 11/2012 Kim ....................... G01C 19/56 73/504.12
2021/0065990 A1 3/2021 Fujimoto et al.
2021/0171337 A1* 6/2021 Liukku ................... G01P 1/003
2023/0305036 A1* 9/2023 Torkkeli ............. G01P 15/0802

FOREIGN PATENT DOCUMENTS

JP 2021-032819 A 3/2021

* cited by examiner

*Primary Examiner* — Walter L Lindsay, Jr.
*Assistant Examiner* — Philip T Fadul
(74) *Attorney, Agent, or Firm* — Harness, Dickey & Pierce, P.L.C.

(57) ABSTRACT

The physical quantity sensor includes, a first support beam, a movable body, a first stationary electrode fixation part, a first stationary electrode unit, a second stationary electrode unit, and a first wiring line. The first stationary electrode unit is disposed at the first direction side of the first support beam and the second stationary electrode unit is disposed at a fourth direction side of the first support beam. A rotary torque of the second movable electrode unit is lower than a rotary torque of the first movable electrode unit. The movable body has an opening at a fourth direction side with respect to the first support beam, and the first wiring line is extracted from the first stationary electrode fixation part to an outside of the movable body through the opening.

8 Claims, 30 Drawing Sheets

PHYSICAL QUANTITY SENSOR AND INERTIAL MEASUREMENT DEVICE

The present application is based on, and claims priority from JP Application Serial Number 2022-163048, filed Oct. 11, 2022, the disclosure of which is hereby incorporated by reference herein in its entirety.

BACKGROUND

1. Technical Field

The present disclosure relates to a physical quantity sensor, an inertial measurement device, and so on.

2. Related Art

In JP-A-2021-032819 (Document 1), there is disclosed a physical quantity sensor for detecting the acceleration in a Z direction. There is disclosed the fact that in that physical quantity sensor, the length of a first electrode along a first direction out of a plurality of first electrodes is shorter than the length of a first electrically conductive part along the first direction of the first electrically conductive part. Further, there is disclosed the fact that in that physical quantity sensor, the length of a second electrode along the first direction out of a plurality of second electrodes is shorter than the length of a second electrically conductive part along the first direction of the second electrically conductive part. Optimization of a structure such as further reduction in size or an increase in sensitivity is required for the physical quantity sensor. Therefore, it is desired that the optimization of the structure of the physical quantity sensor or the like is not hindered due to an arrangement of wiring to be coupled to movable electrodes and stationary electrodes to be used for detecting a capacitance. Document 1 does not disclose a method related to the arrangement of the wiring for the physical quantity sensor.

SUMMARY

An aspect of the present disclosure relates to a physical quantity sensor configured to detect a physical quantity in a third direction when defining three directions perpendicular to each other as a first direction, a second direction, and the third direction, the physical quantity sensor including a substrate, a first fixation part fixed to the substrate, a first support beam one end of which is coupled to the first fixation part, and which extends along the second direction, a movable body coupled to another end of the first support beam, a first stationary electrode fixation part fixed to the substrate, a second stationary electrode fixation part fixed to the substrate, a first stationary electrode unit which is coupled to the first stationary electrode fixation part, and which is disposed at the first direction side of the first support beam, a second stationary electrode unit which is coupled to the second stationary electrode fixation part, and which is disposed at a fourth direction side of the first support beam, the fourth direction being opposite to the first direction, and a first wiring line coupled to the first stationary electrode fixation part, wherein the movable body includes a first movable electrode unit having a movable electrode opposed to a stationary electrode of the first stationary electrode unit, and a second movable electrode unit having a movable electrode opposed to a stationary electrode of the second stationary electrode unit, a rotary torque of the second movable electrode unit when detecting the physical quantity taking the first support beam as a rotational axis is lower than a rotary torque of the first movable electrode unit when detecting the physical quantity taking the first support beam as the rotational axis, the movable body has an opening at the fourth direction side with respect to the first support beam, and the first wiring line is extracted from the first stationary electrode fixation part to an outside of the movable body through the opening.

Another aspect of the present disclosure relates to an inertial measurement device including the physical quantity sensor described above, and a controller configured to perform control based on a detection signal output from the physical quantity sensor.

DESCRIPTION OF AN EXEMPLARY EMBODIMENT

A preferred embodiment of the present disclosure will hereinafter be described in detail. It should be noted that the present embodiment described hereinafter does not unreasonably limit the content as set forth in the appended claims, and all of the constituents described in the present embodiment are not necessarily essential constituent requirements.

Figure 1:
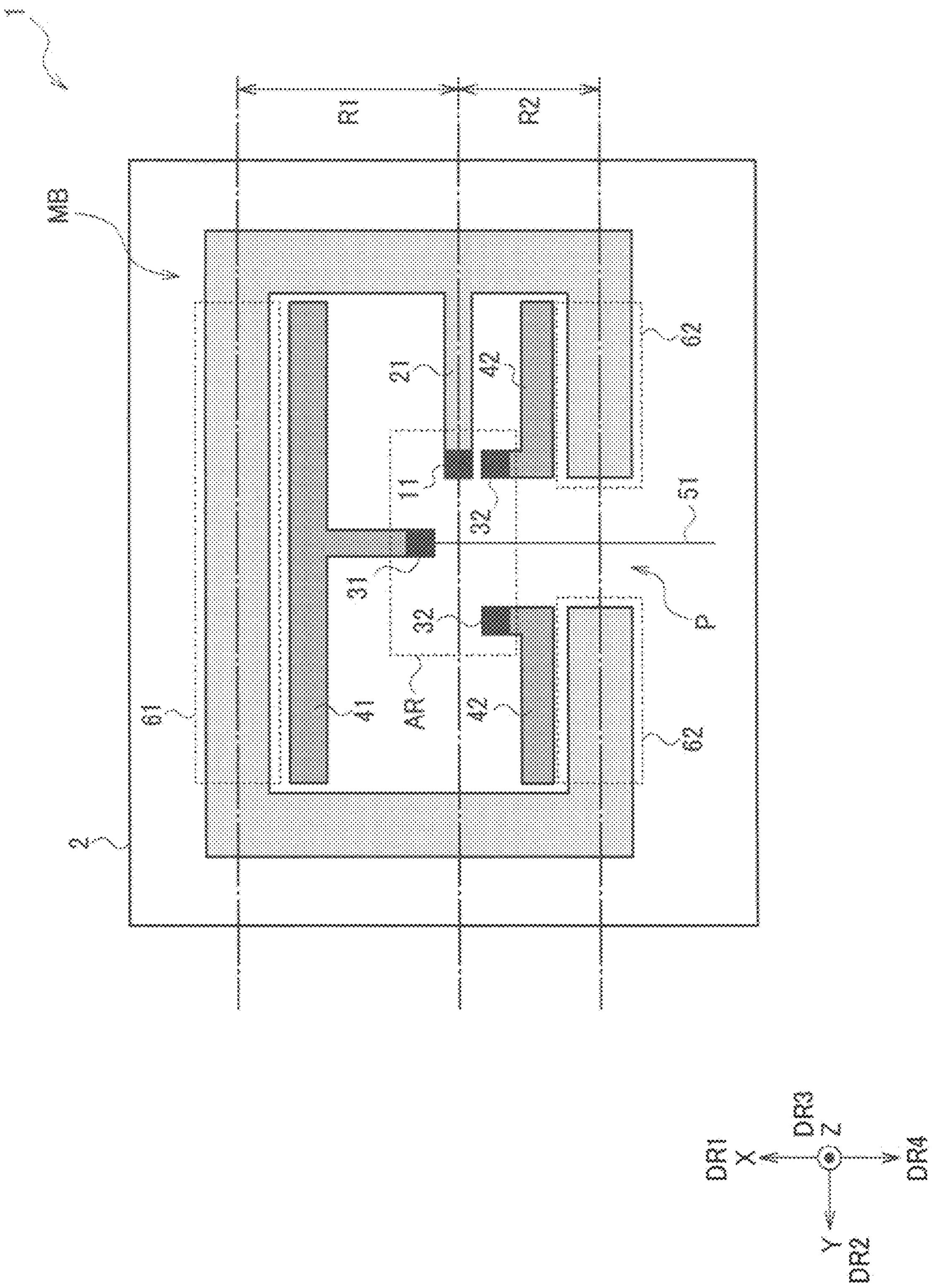
FIG. 1 is a plan view for explaining an example of a physical quantity sensor.

A physical quantity sensor 1 according to the present embodiment includes a substrate 2, a first fixation part 11, a first support beam 21, a movable body MB, a first stationary electrode fixation part 31, second stationary electrode fixation parts 32, a first stationary electrode unit 41, second stationary electrode units 42, and a first wiring line 51. FIG. 1 is a plan view in a planar view in a direction perpendicular to the substrate 2 of the physical quantity sensor 1 according to the present embodiment. Further, directions perpendicular to each other in FIG. 1 are defined as a first direction DR1, a second direction DR2, and a third direction DR3, and the first direction DR1, the second direction DR2, and the third direction DR3 correspond respectively to, for example, a +X-axis direction, a +Y-axis direction, and a +Z-axis direction. The physical quantity sensor 1 according to the present embodiment is an inertial sensor as, for example, an MEMS (Micro Electro Mechanical Systems) device, and detects a physical quantity in the third direction DR3. It should be noted that the term "perpendicular" includes when the directions cross each other at an angle slightly tilted from 90° in addition to when the directions cross each other at 90°. Further, in the present embodiment, a direction opposite to the first direction DR1 is defined as a fourth direction DR4. In other words, in FIG. 1, the fourth direction DR4 is, for example, a −X-axis direction. Further, a direction opposite to the third direction DR3 is defined as a fifth direction DR5. For example, although not shown in FIG. 1, the fifth direction DR5 is, for example, a −Z-axis direction.

For example, when assuming an X-Y plane as a plane along the first direction DR1 and the second direction DR2 as a horizontal plane, the third direction DR3 becomes a vertical direction, and therefore, it is possible to apply the physical quantity sensor 1 as an acceleration sensor for detecting the acceleration in, for example, the vertical direction. It should be noted that a correspondence relationship between the first direction DR1 through the third direction DR3 and the XYZ axes described above is illustrative only, and is not limited to the above. The following description does not hinder an application of the present embodiment assuming, for example, the first direction DR1 or the second direction DR2 as the Z axis, and does not require any of the first direction DR1 through the third direction DR3 to necessarily be parallel to the vertical direction.

Further, although the description will hereinafter be presented mainly citing when the physical quantity to be detected by the physical quantity sensor 1 is the acceleration as an example, the physical quantity is not limited to the acceleration, and can be other physical quantities such as velocity, pressure, a displacement, a posture, angular velocity, or a gravitational force, and it is possible for the physical quantity sensor 1 to be used as a pressure sensor, an MEMS switch, or the like. Further, in any of the drawings in the present embodiment, dimensions of the members, distances between the members, and so on are schematic illustrations for the sake of convenience of explanation, but do not represent the actual dimensions, distances, and so on. Further, the physical quantity sensor 1 according to the present embodiment is illustrated with some of the constituents omitted. Some of the constituents correspond to, for example, a shield structure.

The substrate 2 is, for example, a silicon substrate formed of semiconductor silicon, or a glass substrate formed of a glass material such as borosilicate glass. It should be noted that the constituent material of the substrate 2 is not particularly limited, and it is possible to use a quartz substrate, an SOI (Silicon On Insulator) substrate, or the like.

The first fixation part 11 is fixed to the substrate 2, and plays a role as an anchor in a seesaw motion of the movable body MB. It should be noted that the seesaw motion of the movable body MB is hereinafter referred to as a swaying motion in some cases. Specifically, an end of the first support beam 21 is coupled to the first fixation part 11, and the movable body MB is coupled to the other end of the first support beam 21. In other words, the first fixation part 11 couples the movable body MB to the substrate 2 via the first support beam 21. It should be noted that although the illustration with a cross-sectional view and so on will be omitted, a hollow part is formed at the fifth direction DR5 side of the movable body MB, and thus, it is arranged that the movable body MB and the substrate 2 do not interfere with each other due to an action of the movable body MB.

It should be noted that in the present embodiment, for example, the phrase "the first fixation part 11 and the substrate 2 are fixed to each other" means that a member of the first fixation part 11 and a member of the substrate 2 which are originally separated from each other are fixed to each other using a predetermined material and a predetermined construction method, but this is not a limitation. There is included when, for example, in one member formed integrally, a portion corresponding to the first fixation part 11 and a portion corresponding to the substrate 2 are called separately from each other for the sake of convenience of explanation. Similarly, for example, the phrase "the movable body MB is coupled to the other end of the first support beam 21" includes when the first support beam 21 is integrally formed as a part of the movable body MB, but the movable body MB and the first support beam 21 are described separately from each other for the sake of convenience. The same applies also to "fixation" and "coupling" in the following explanation.

The first support beam 21 is disposed so that the second direction DR2 is the longitudinal direction in the planar view shown in FIG. 1, and is arranged to be deflected with respect to the seesaw motion of the movable body MB. In other words, the first support beam 21 is twisted on the Y axis to thereby provide a restoring force in the seesaw motion of the movable body MB. As described above, the first support beam 21 has a characteristic as a torsion spring which is twisted taking the second direction DR2 as a rotational axis. Thus, there is realized the swaying motion of the movable body MB taking the second direction DR2 as a rotational axis. It should be noted that the thickness in the first direction DR1 of the first support beam 21 is arbitrarily adjusted, and the illustration in FIG. 1 and so on is not accurate. It is possible to, for example, make the thickness in the first direction DR1 of the first support beam 21 thinner than the thickness in the first direction DR1 of the first fixation part 11, and the details thereof will be described later.

The first stationary electrode fixation part 31 is fixed to the substrate 2. Further, the first stationary electrode fixation part 31 is coupled to the first stationary electrode unit 41. The first stationary electrode unit 41 is disposed at the first direction DR1 side of the first support beam 21. In other words, the first stationary electrode unit 41 is fixed to the substrate 2 via the first stationary electrode fixation part 31 to play a role as a probe electrode. It should be noted that the first stationary electrode fixation part 31 is illustrated so as to be coupled to the first stationary electrode unit 41 via a first stationary electrode base extending in the fourth direction DR4 from the first stationary electrode unit 41 in FIG. 1, but this is not a limitation, and it is possible to omit the first stationary electrode base, which can arbitrarily be determined. Further, although there is illustrated the single first stationary electrode fixation part 31 in FIG. 1, it is possible to provide a plurality of the first stationary electrode fixation parts 31.

The second stationary electrode fixation parts 32 are fixed to the substrate 2. Further, the second stationary electrode fixation parts 32 are respectively coupled to the second stationary electrode units 42. The second stationary electrode unit 42 is disposed at the fourth direction DR4 side of the first support beam 21. The fourth direction DR4 is an opposite direction to the first direction DR1. In other words, the second stationary electrode units 42 are each fixed to the substrate 2 via the second stationary electrode fixation part 32 to play a role as a probe electrode.

The movable body MB includes a first movable electrode unit 61 and second movable electrode units 62. The first movable electrode unit 61 has a movable electrode opposed to a stationary electrode of the first stationary electrode unit 41. The second movable electrode units 62 have movable electrodes opposed to stationary electrodes of the second stationary electrode units 42, respectively. In other words, the first movable electrode unit 61 plays a role as a probe electrode which can move integrally with the movable body MB. Similarly, the second movable electrode units 62 each play a role as a probe electrode which can move integrally with the movable body MB. It should be noted that the stationary electrodes and the movable electrodes are respectively opposed to each other in the first direction DR1 in an example shown in FIG. 1, but this is not a limitation. For example, as explained with reference to FIG. 13, FIG. 14, FIG. 15, and so on described later, it is possible for the stationary electrode of the first stationary electrode unit 41 to be disposed so as to be opposed to the movable electrode of the first movable electrode unit 61 in the second direction DR2. Similarly, the stationary electrodes of the second stationary electrode units 42 can be disposed so as to be opposed to the movable electrodes of the second movable electrode units 62, respectively.

Further, in the example shown in FIG. 1, the stationary electrode of the first stationary electrode unit 41 and the movable electrode of the first movable electrode unit 61 each have a predetermined thickness along the second direction DR2 and the third direction DR3. Thus, the stationary electrode of the first stationary electrode unit 41 and the movable electrode of the first movable electrode unit 61 are opposed to each other as much as the predetermined area, and thus, it is possible to detect a predetermined physical quantity corresponding to the predetermined area. The predetermined physical quantity is, for example, a capacitance. Thus, the stationary electrode of the first stationary electrode unit 41 and the movable electrode of the first movable electrode unit 61 play a role as, for example, a P-side electrode of a probe. Similarly, the stationary electrodes of the second stationary electrode units 42 and the movable electrodes of the second movable electrode units 62 also have a predetermined thickness along the second direction DR2 and the third direction DR3, and therefore, it is possible to detect the predetermined physical quantity corresponding to the area in which the stationary electrodes of the second stationary electrode units 42 and the movable electrodes of the second movable electrode units 62 are opposed to each other. Thus, the stationary electrodes of the second stationary electrode units 42 and the movable electrodes of the second movable electrode units 62 play a role as, for example, an N-side electrode of the probe.

It should be noted that the thickness mentioned here includes not only a physical thickness measured with an SEM (Scanning Electron Microscope) or the like, but also a film thickness estimated from optical characteristics such as a refractive index of a thin film. Further, for the sake of convenience of explanation, the thickness along the third direction DR3 of the stationary electrode of the first stationary electrode unit 41 is collectively called the thickness of the first stationary electrode unit 41 in some cases. Similarly, the thickness along the third direction DR3 of the stationary electrodes of the second stationary electrode units 42 is collectively called the thickness of the second stationary electrode units 42 in some cases. Similarly, the thickness along the third direction DR3 of the movable electrode of the first movable electrode unit 61 is called the thickness of the first movable electrode unit 61 in some cases, and the thickness along the third direction DR3 of the movable electrodes of the second movable electrode units 62 is called the thickness of the second movable electrode units 62 in some cases. Further, the thickness of the first stationary electrode unit 41, the thickness of the second stationary electrode units 42, the thickness of the first movable electrode unit 61, and the thickness of the second movable electrode units 62 do not particularly matter, but can have a certain relationship with each other, and the details thereof will be described later. It should be noted that it is desirable for the thicknesses in the third direction DR3 of the first support beam 21, the first movable electrode unit 61, the second movable electrode units 62, and so on as constituents included in the movable body MB to be kept the same. The same applies to when a second support beam 22 described later and so on are included, when a comb-tooth structure is included, and so on.

Further, at a predetermined timing, a sum of the predetermined physical quantity corresponding to the area in which the stationary electrode of the first stationary electrode unit 41 and the movable electrode of the first movable electrode unit 61 are opposed to each other, and the predetermined physical quantity corresponding to the area in which the stationary electrodes of the second stationary electrode units 42 and the movable electrodes of the second movable electrode units 62 are opposed to each other corresponds to the predetermined physical quantity to be detected by the physical quantity sensor 1 at the predetermined timing.

In the physical quantity sensor 1 according to the present embodiment, a rotary torque of the second movable electrode units 62 when taking the first support beam 21 as the rotational axis is made lower than a rotary torque of the first movable electrode unit 61 when taking the first support beam 21 as the rotational axis. It should be noted that in the following description, the rotary torque of the first movable electrode unit 61 when taking the first support beam 21 as the rotational axis is called a “rotary torque of the first movable electrode unit 61” in some cases, and the rotary torque of the second movable electrode units 62 when taking the first support beam 21 as the rotational axis is simply called a “rotary torque of the second movable electrode units 62” in some cases. A method of making the rotary torque of the first movable electrode unit 61 and the rotary torque of the second movable electrode units 62 different from each other does not particularly matter. For example, as shown in FIG. 1, it can be realized by making a distance R1 from the first support beam 21 as the rotational axis of the movable body MB to the center of the first movable electrode unit 61 longer than a distance R2 from the first support beam 21 to the center of the second movable electrode units 62, but this is not a limitation. In other words, if the rotary torque of the second movable electrode units 62 when taking the first support beam 21 as the rotational axis is made lower than the rotary torque of the first movable electrode unit 61 when taking the first support beam 21 as the rotational axis using the predetermined method, the distance R1 and the distance R2 shown in FIG. 1 can be the same or substantially the same as each other. The predetermined method means that, for example, an opening P described later is provided. In other words, in the present embodiment, in the case of a movable body MB having an opening P described later, that movable body can be symmetric about the first support beam 21 as an axis. Further, it is possible to further provide the opening P to the movable body MB in which the rotary torque of the second movable electrode units 62 has already been made lower than the rotary torque of the first movable electrode unit 61 by making the distance R1 longer than the distance R2 as described above. Alternatively, it is possible to decrease the rotary torque of the second movable electrode units 62 compared to the first movable electrode unit 61 by disposing a portion to be a mass part at the first movable electrode unit 61 side in the movable body MB as explained with reference to FIG. 11 described later.

For example, a timing in the initial state is defined as a first timing, and a timing in the state in which the acceleration in the third direction DR3 occurs in the physical quantity sensor 1 is defined as a second timing. The initial state mentioned here means a resting state in which no other acceleration than the gravitational acceleration occurs. Due to the relationship of the rotary torque described above, for example, when a change from the first timing to the second timing occurs, the first movable electrode unit 61 is displaced toward a direction opposite to the direction of the acceleration which has occurred in the physical quantity sensor 1, namely the fifth direction DR5, and the second movable electrode units 62 are displaced toward the third direction DR3. In this way, at the second timing, the area in which the stationary electrode of the first stationary electrode unit 41 and the movable electrode of the first movable electrode unit 61 are opposed to each other changes, and the area in which the stationary electrodes of the second stationary electrode units 42 and the movable electrodes of the second movable electrode units 62 are opposed to each other changes. Thus, it is possible to detect the change in physical quantity based on the change in the area in which the electrodes are opposed to each other at the second timing.

Further, a timing in the state in which the acceleration in the fifth direction DR5 occurs in the physical quantity sensor 1 is defined as a third timing. For example, when a change from the first timing to the third timing occurs, the first movable electrode unit 61 is displaced toward the third direction DR3, and the second movable electrode units 62 are displaced toward the fifth direction DR5 on the same grounds. In this way, at the third timing, the area in which the stationary electrode of the first stationary electrode unit 41 and the movable electrode of the first movable electrode unit 61 are opposed to each other changes, and the area in which the stationary electrodes of the second stationary electrode units 42 and the movable electrodes of the second movable electrode units 62 are opposed to each other changes. Thus, it is possible to detect the change in physical quantity based on the change in the area in which the electrodes are opposed to each other at the third timing.

It should be noted that the structure of the movable body MB of the physical quantity sensor 1 according to the present embodiment is not limited to FIG. 1. For example, the parts constituting the movable body MB are illustrated in FIG. 1 so as to be formed of straight lines along the first direction DR1 or the second direction DR2, but the movable body MB in the present embodiment is not limited thereto, and can also include a portion formed of, for example, a curved shape.

The first wiring line 51 is coupled to the first stationary electrode fixation part 31. For example, when the physical quantity is the capacitance as described above, the first wiring line 51 plays a role of transferring an electrical signal including information of the physical quantity to be detected from the probe electrodes formed of the stationary electrode of the first stationary electrode unit 41 and the movable electrode of the first movable electrode unit 61 to a differential amplifier circuit not shown in FIG. 1.

Further, in the physical quantity sensor 1 according to the present embodiment, the movable body MB has the opening P at the fourth direction DR4 with respect to the first support beam 21. For example, in FIG. 1, a portion plays a role as the second movable electrode units 62 is divided into two by the opening P, and each of the second movable electrode units 62 makes the swaying motion taking the first fixation part 11 as the anchor, and the first support beam 21 as the rotational axis. Therefore, in FIG. 1, there is the illustration in which there are the two second stationary electrode units 42 fixed to the substrate 2 via the respective second stationary electrode fixation parts 32. It should be noted that in FIG. 1, for example, either one of the electrode unit located at the +Y direction side and the electrode unit located at the −Y direction side with respect to the opening P is not required to have a role as the second movable electrode unit 62. In this case, it is sufficient to dispose the second stationary electrode fixation part 32 and the second stationary electrode unit 42 so as to be opposed to one having the role as the second movable electrode unit 62. Further, it is assumed that the opening P is opened to the extent that no problem occurs in impact resistance and so on of the movable body MB.

Further, the first wiring line 51 is extracted from the first stationary electrode fixation part 31 to the outside of the movable body MB through the opening P. Thus, the information of the physical quantity to be detected by the stationary electrode of the first stationary electrode unit 41 and the movable electrode of the first movable electrode unit 61 is output to the outside of the movable body MB in the substrate 2.

As described above, when defining the three directions perpendicular to each other as the first direction DR1, the second direction DR2, and the third direction DR3, the physical quantity sensor 1 according to the present embodiment detects the physical quantity in the third direction DR3. The physical quantity sensor 1 includes the substrate 2, the first fixation part 11, the first support beam 21, the movable body MB, the first stationary electrode fixation part 31, the second stationary electrode fixation parts 32, the first stationary electrode unit 41, the second stationary electrode units 42, and the first wiring line 51. The first fixation part 11 is fixed to the substrate 2. The first support beam 21 is coupled to the first fixation part 11 at one end thereof, and extends along the second direction DR2. The movable body MB is coupled to the other end of the first support beam 21. The first stationary electrode fixation part 31 is fixed to the substrate 2. The second stationary electrode fixation parts 32 are fixed to the substrate 2. The first stationary electrode unit 41 is coupled to the first stationary electrode fixation part 31, and is disposed at the first direction DR1 side of the first support beam 21. The second stationary electrode units 42 are respectively coupled to the second stationary electrode fixation parts 32, and are disposed at the fourth direction DR4 side, which is the opposite direction of the first direction DR1 from the first support beam 21. The first wiring line 51 is coupled to the first stationary electrode fixation part 31. The movable body MB includes the first movable electrode unit 61 having the movable electrode opposed to the stationary electrode of the first stationary electrode unit 41, and the second movable electrode units 62 respectively having the movable electrodes opposed to the stationary electrodes of the second stationary electrode units 42. The rotary torque of the second movable electrode units 62 when detecting the physical quantity taking the first support beam 21 as the rotational axis is lower than the rotary torque of the first movable electrode unit 61 when detecting the physical quantity taking the first support beam 21 as the rotational axis. The movable body MB has the opening P at the fourth direction DR4 side with respect to the first support beam 21, and the first wiring line 51 is extracted from the first stationary electrode fixation part 31 to the outside of the movable body MB through the opening P.

As described above, the physical quantity sensor 1 according to the present embodiment includes the substrate 2, the movable body MB, the first support beam 21, the first stationary electrode unit 41, and the second stationary electrode units 42, and can therefore be made to function as the physical quantity sensor 1 of a bilateral seesaw type. Further, by further including the first fixation part 11, the first stationary electrode fixation part 31, and the second stationary electrode fixation parts 32, it is possible to fix the first support beam 21, the first stationary electrode unit 41, and the second stationary electrode unit 42 to the substrate 2. Further, since the first movable electrode unit 61 and the second movable electrode units 62 are included, it is possible to form the probe electrodes opposed to the first stationary electrode unit 41 and the second stationary electrode units 42. Further, since the first wiring line 51 is included, it is possible to output an electrical signal from the probe electrode including the first stationary electrode unit 41 via the first stationary electrode fixation part 31. Further, since the rotary torque of the second movable electrode units 62 is lower than the rotary torque of the first movable electrode unit 61, a bias in weight balance of the movable body MB occurs, and it becomes possible to accurately detect the physical quantity with respect to application of the acceleration or the like. Further, since the opening P is provided at the fourth direction DR4 side with respect to the first support beam 21, it is possible to reduce the rotary torque of the second movable electrode units 62, and therefore, it is possible to easily cause the bias in the weight balance of the movable body MB. Thus, it becomes possible to do without the bias in the weight balance of the movable body MB with the distance from the rotational axis, and thus, it is possible to optimize the size of the movable body MB. Further, since the first wiring line 51 is extracted from the first stationary electrode fixation part 31 to the outside of the movable body MB through the opening P, it is possible to increase the degree of freedom in designing the first wiring line 51. Further, since it is possible to locate the first stationary electrode unit 41 at the inner side of the first movable electrode unit 61, it is possible to reduce the size of the physical quantity sensor 1. Thus, it is possible to realize the physical quantity sensor 1 which achieves both of an increase in degree of freedom in wiring and an optimization of the structure.

The method according to the present embodiment is not limited to the above, and can be implemented with a variety of modifications such as an addition of a further feature to the features described above. For example, it is possible to arrange that the first stationary electrode fixation part 31 is disposed in a predetermined area between the first stationary electrode unit 41 and the second stationary electrode units 42 in the planar view in a direction perpendicular to the substrate 2. In the following description, that predetermined area is called a fixation part arrangement area AR. In other words, in the physical quantity sensor according to the present embodiment, the first stationary electrode fixation part 31 is arranged in the fixation part arrangement area AR located between the first stationary electrode unit 41 and the second stationary electrode units 42.

In this way, it is possible to suppress an influence of a warpage of the substrate 2 which occurs in the first stationary electrode unit 41. The longer the distance from the center of the substrate 2, the more significant the influence caused by the warpage of the substrate 2 on a variety of devices arranged on the substrate 2 is. In that regard, by applying the method according to the present embodiment, it is possible to arrange the first stationary electrode fixation part 31 in the fixation part arrangement area AR located in the vicinity of the center of the substrate. Thus, when the warpage occurs in the substrate 2 due to, for example, external stress or a temperature change, it is possible to suppress a fluctuation of the electrical signal to be output from the probe electrodes including the first stationary electrode unit 41.

Further, it is possible for the movable body MB to have a structure including a portion along the first direction DR1 or the second direction DR2 in the planar view in a direction perpendicular to the substrate 2. Specifically, as shown in, for example, FIG. 2, it is possible to couple a first coupler 81 extending along the first direction DR1 to the other end of the first support beam 21. Further, it is possible to couple a first base 91 extending along the second direction DR2 to the first coupler 81 at the first direction DR1 side of the first support beam 21, and it is possible to couple a second base 92 extending along the second direction DR2 to the first coupler 81 at the fourth direction DR4 side of the first support beam 21. In this example, by providing a movable electrode not shown formed along the third direction DR3 or the fifth direction DR5 to the first base 91, the first base 91 functions as the first movable electrode unit 61. In other words, the thickness of the first base 91 corresponds to the thickness of the first movable electrode unit 61. Similarly, by providing a movable electrode not shown formed along the third direction DR3 or the fifth direction DR5 to the second base 92, the second base 92 functions as the second movable electrode unit 62. In other words, the thickness of the second base 92 corresponds to the thickness of the second movable electrode unit 62.

Figure 2:
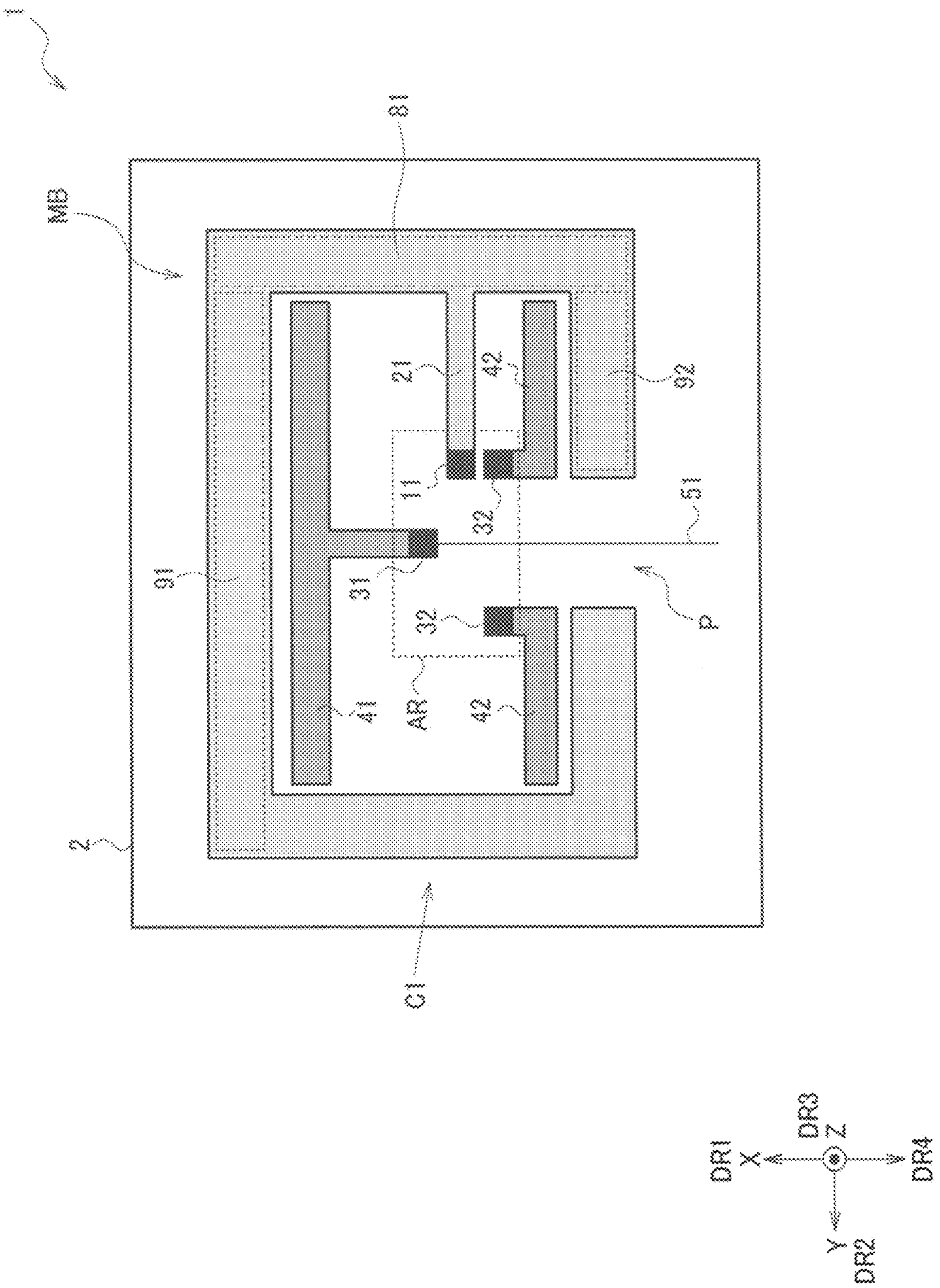
FIG. 2 is a plan view for explaining another example of the physical quantity sensor.

It should be noted that in FIG. 2, one end of the first base 91 is coupled to the first coupler 81, and the other end of the first base 91 is coupled to a predetermined part extending toward the fourth direction DR4 as indicated by C1. Further, the predetermined part is arranged to be able to make an oscillation motion taking the first support beam 21 as an axis at the fourth direction DR4 side of at least the first support beam 21. It should be noted that a structure of the predetermined part indicated by C1 is not particularly limited, and is not limited to the shape shown in FIG. 2. For example, the other end of the first base 91 can be coupled to the predetermined part shaped like a circular arc. As described above, in the physical quantity sensor 1 according to the present embodiment, the movable body MB includes the first coupler 81, the first base 91, and the second base 92. The first coupler 81 is coupled to the other end of the first support beam 21, and extends along the first direction DR1. The first base 91 is disposed at the first direction DR1 side of the first support beam 21, coupled to the first coupler 81, and extends along the second direction DR2, and is provided with the movable electrode of the first movable electrode unit 61. The second base 92 is disposed at the fourth direction DR4 side of the first support beam 21, coupled to the first coupler 81, and extends along the second direction DR2, and is provided with the movable electrode of the second movable electrode unit 62. In this way, it is possible to make the first base 91 function as the first movable electrode unit 61, and at the same time, it is possible to make the second base 92 function as the second movable electrode unit 62.

Figure 3:
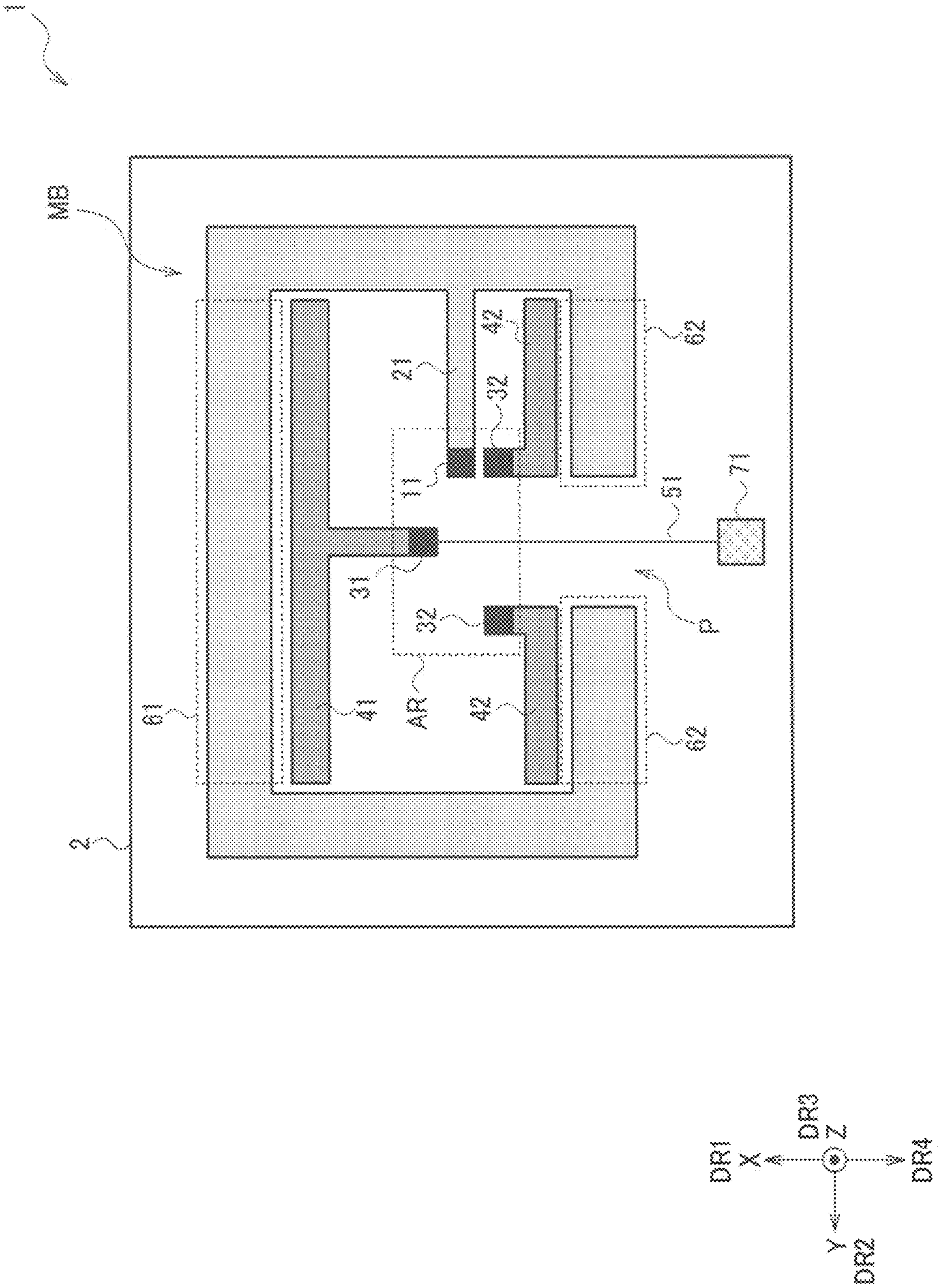
FIG. 3 is a plan view for explaining another example of the physical quantity sensor.

Further, as shown in FIG. 3, it is possible to couple the first wiring line 51 to a first stationary electrode terminal 71. The first stationary electrode terminal 71 is disposed outside the movable body MB, and is used for coupling to an external device not shown. As described above, the physical quantity sensor 1 according to the present embodiment includes the first stationary electrode terminal 71 which is coupled to the other end of the first wiring line 51, and which is disposed outside the movable body MB. In this way, it is possible to couple the first wiring line 51 which is extracted to the outside of the movable body MB from the first stationary electrode unit 41 located inside the movable body MB, to an external apparatus or the like while optimizing the structure of the physical quantity sensor 1.

Figure 4:
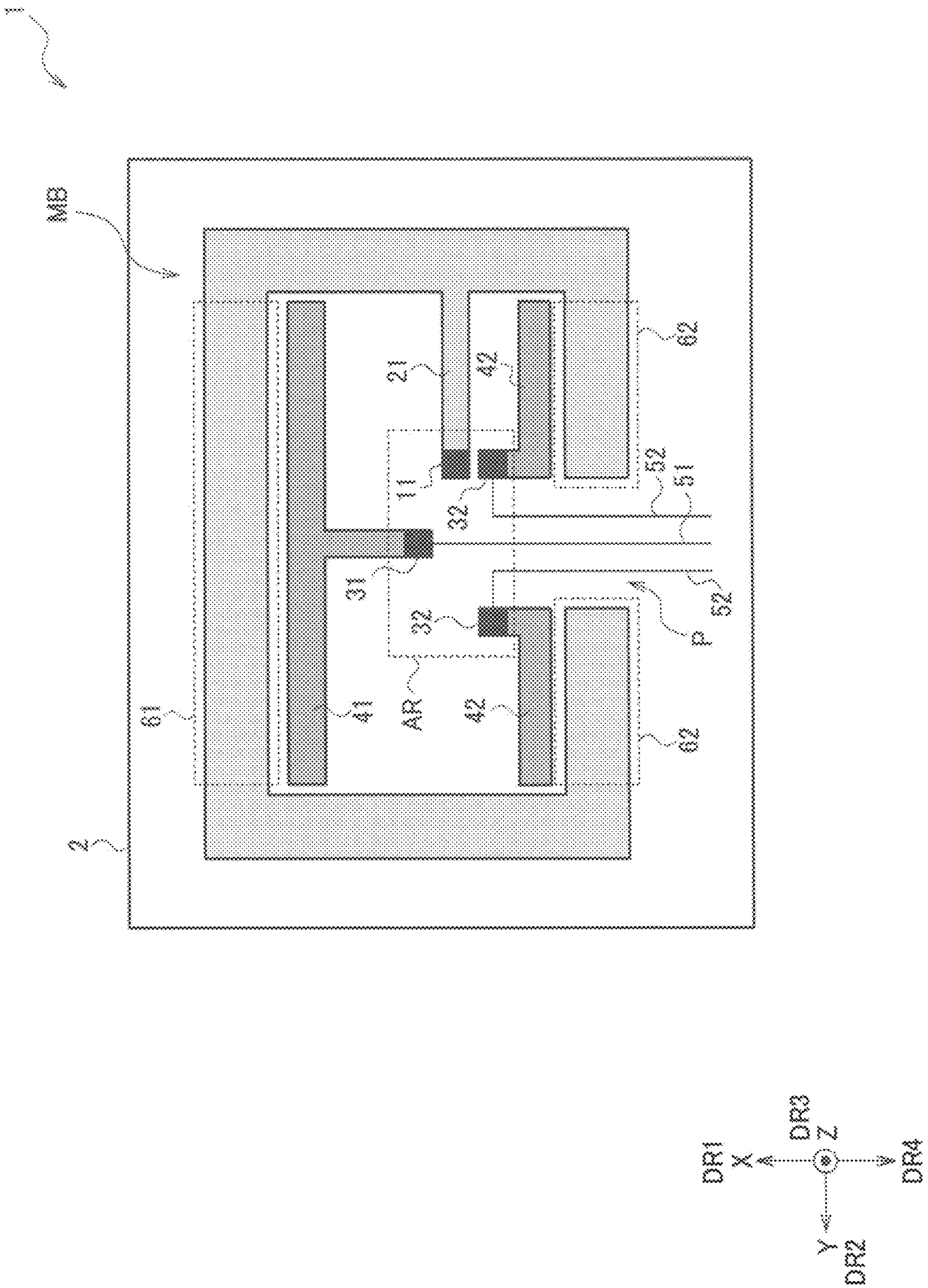
FIG. 4 is a plan view for explaining another example of the physical quantity sensor.

Further, it is also possible to further arrange the second stationary electrode fixation part 32 in the fixation part arrangement area AR as shown in FIG. 1. Further, as shown in, for example, FIG. 4, it is possible to couple second wiring lines 52 respectively to the second stationary electrode fixation parts 32, and extract the second wiring lines 52 to the outside of the movable body MB through the opening P. The second wiring lines 52 each play substantially the same role as that of the first wiring line 51 described above. As described above, the physical quantity sensor 1 according to the present embodiment includes the second wiring lines 52 to be coupled respectively to the second stationary electrode fixation parts 32, the second stationary electrode fixation parts 32 are arranged in the fixation part arrangement area AR, and the second wiring lines 52 are extracted from the respective second stationary electrode fixation parts 32 to the outside of the movable body MB through the opening P. In this way, it is possible to increase the degree of freedom in designing the second wiring lines 52, and at the same time, suppress the influence of the warpage of the substrate 2 caused in the second stationary electrode units 42 by arranging the second stationary electrode fixation parts 32 in the fixation part arrangement area AR in addition to the first stationary electrode fixation part 31. In other words, by the fixation parts of the stationary electrode units being arranged in the fixation part arrangement area AR, it becomes possible to effectively suppress the influence of the warpage of the substrate 2.

Figure 5:
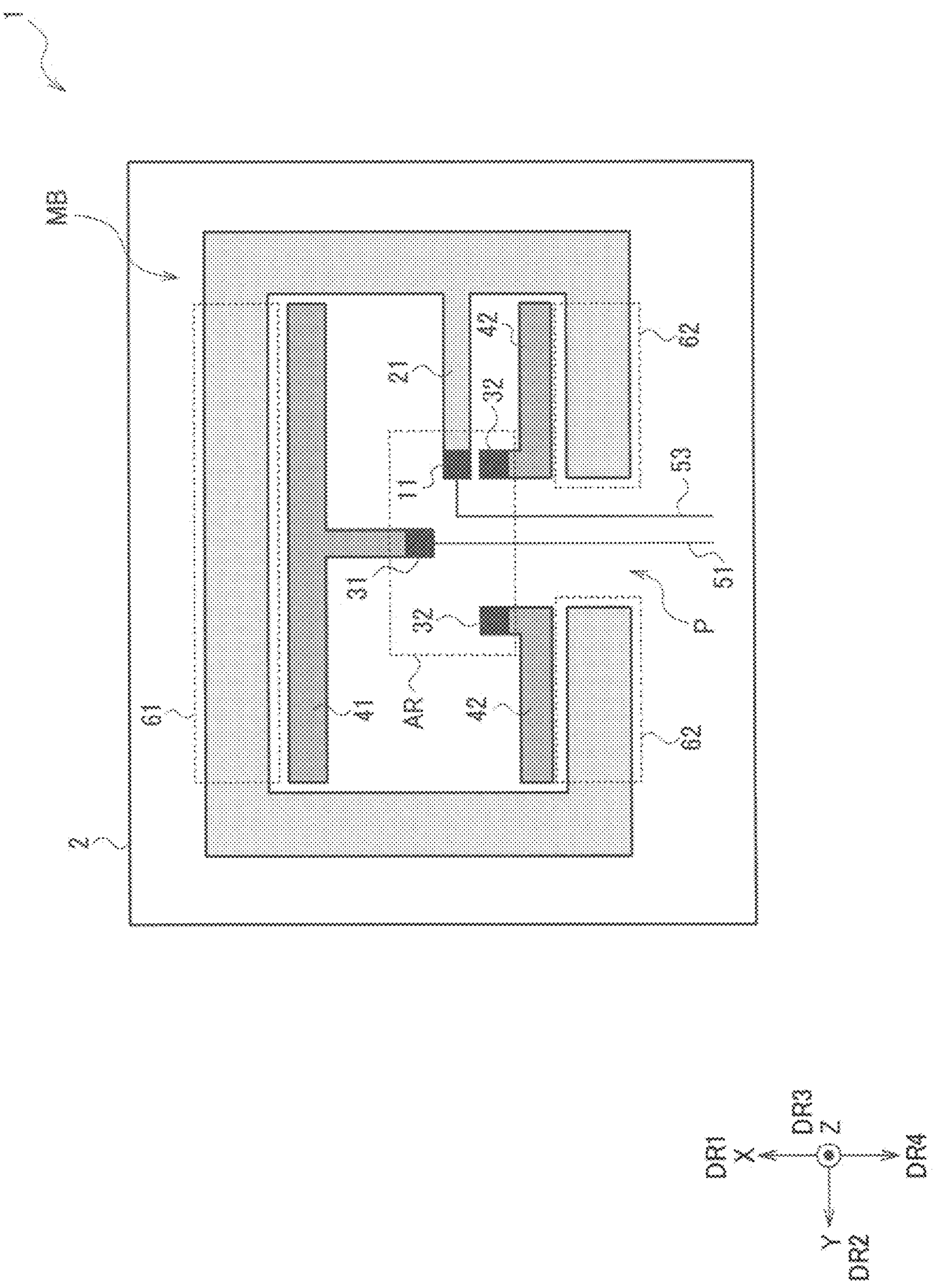
FIG. 5 is a plan view for explaining another example of the physical quantity sensor.

Further, it is also possible to further arrange the first fixation part 11 in the fixation part arrangement area AR as shown in FIG. 1. Further, as shown in FIG. 5, it is possible to couple a third wiring line 53 to the first fixation part 11, and extract the third wiring line 53 to the outside of the movable body MB through the opening P. In other words, the physical quantity sensor 1 according to the present embodiment includes the third wiring line 53 to be coupled to the first fixation part 11. The first fixation part 11 is arranged in the fixation part arrangement area AR, and the third wiring line 53 is extracted from the first fixation part 11 to the outside of the movable body through the opening P. In this way, it is possible to increase the degree of freedom in designing the third wiring line 53, and at the same time, suppress the influence of the warpage of the substrate 2 caused in the first support beam 21. In other words, by the fixation parts of the stationary electrode units and the fixation parts of the movable electrode units being arranged in the fixation part arrangement area AR, it becomes possible to effectively suppress the influence of the warpage of the substrate 2.

Figure 6:
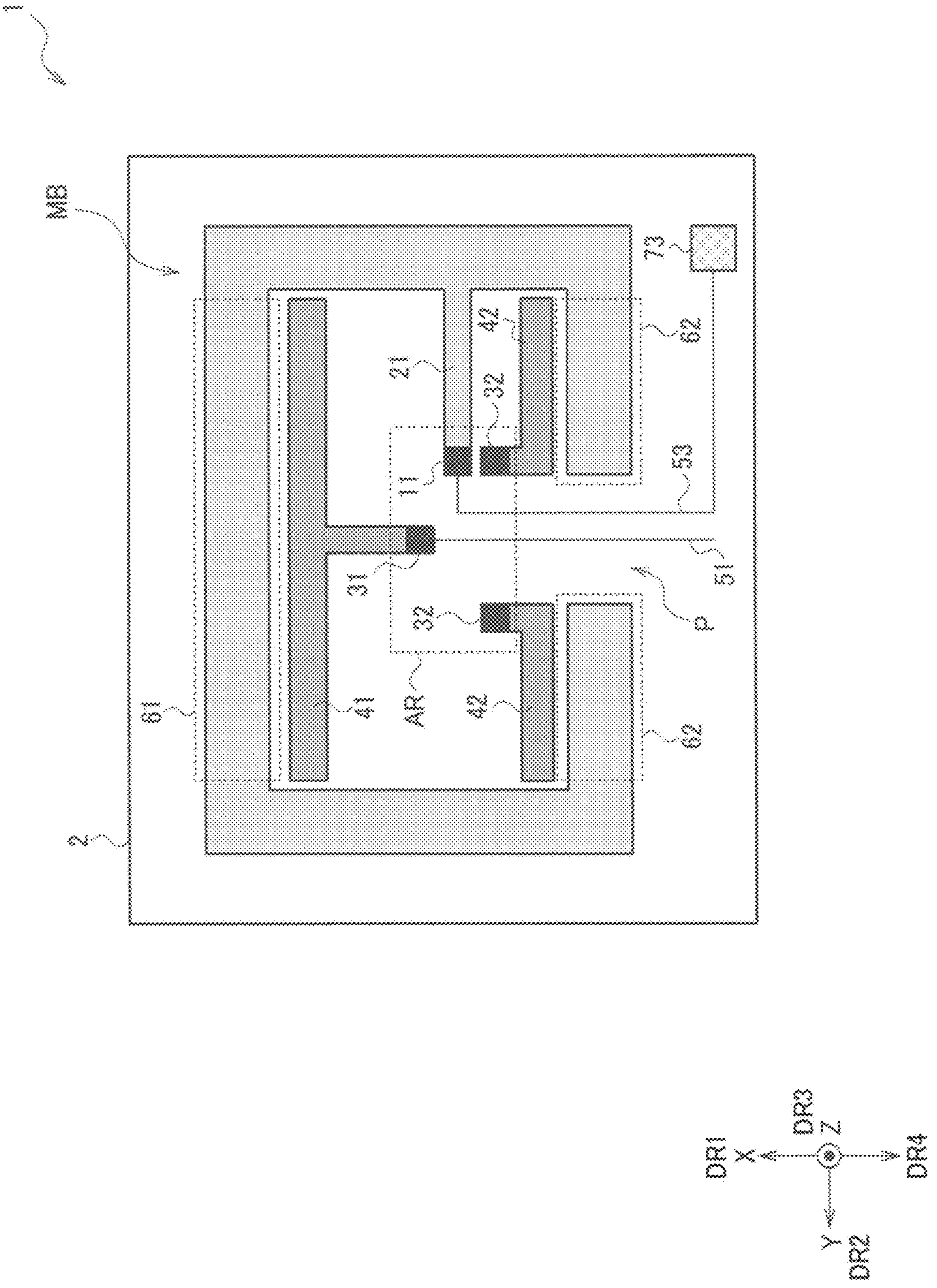
FIG. 6 is a plan view for explaining another example of the physical quantity sensor.

Further, as shown in FIG. 6, it is possible to couple the third wiring line 53 to a movable electrode terminal 73. The movable electrode terminal 73 is disposed outside the movable body MB, and is used for coupling to the external device not shown. As described above, the physical quantity sensor 1 according to the present embodiment includes the movable electrode terminal 73 which is coupled to the other end of the third wiring line 53, and which is disposed outside the movable body MB. In this way, it is possible to couple the third wiring line 53 extracted to the outside of the movable body MB to the external apparatus or the like.

Figure 7:
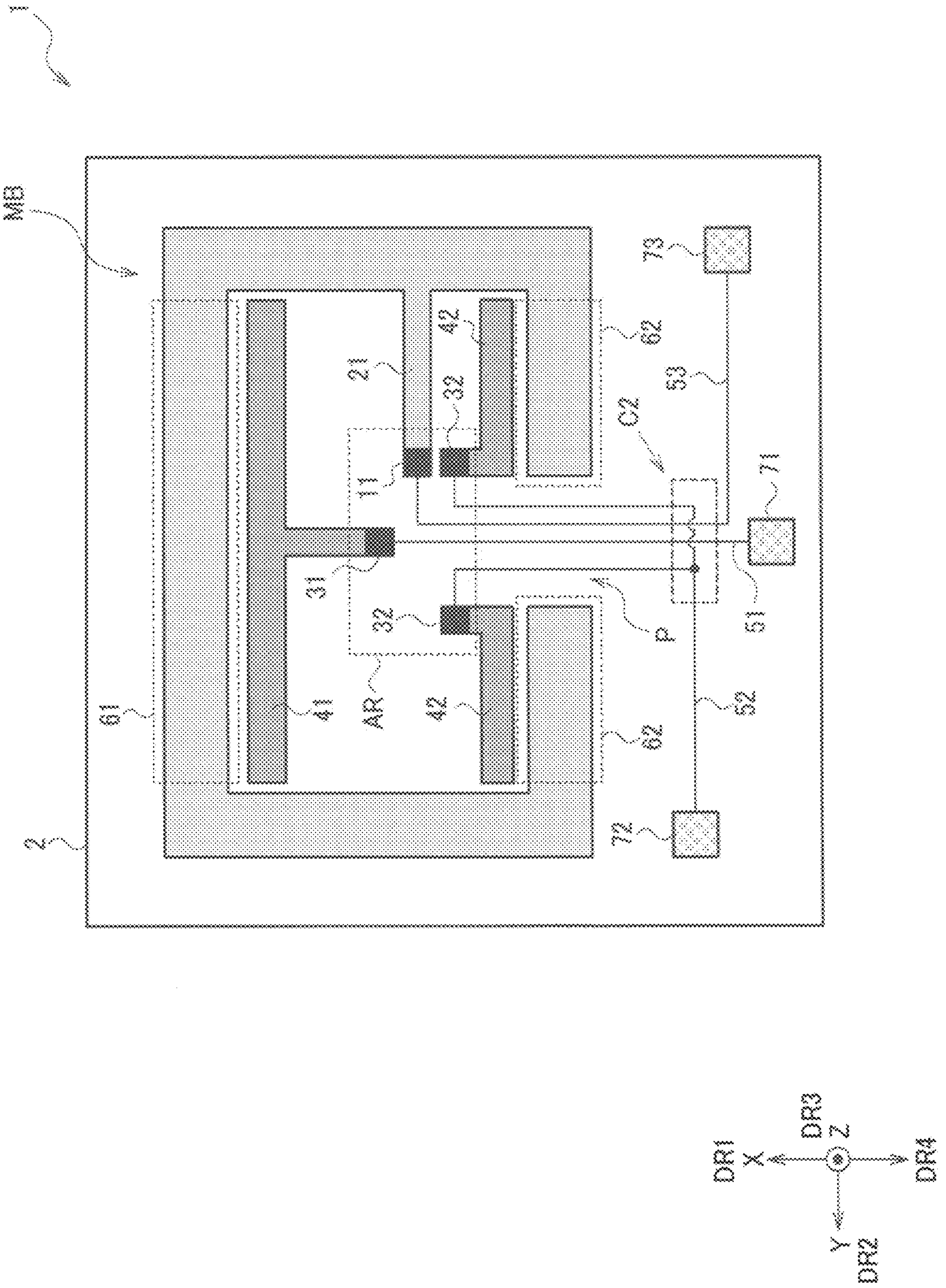
FIG. 7 is a plan view for explaining another example of the physical quantity sensor.
Figure 8:
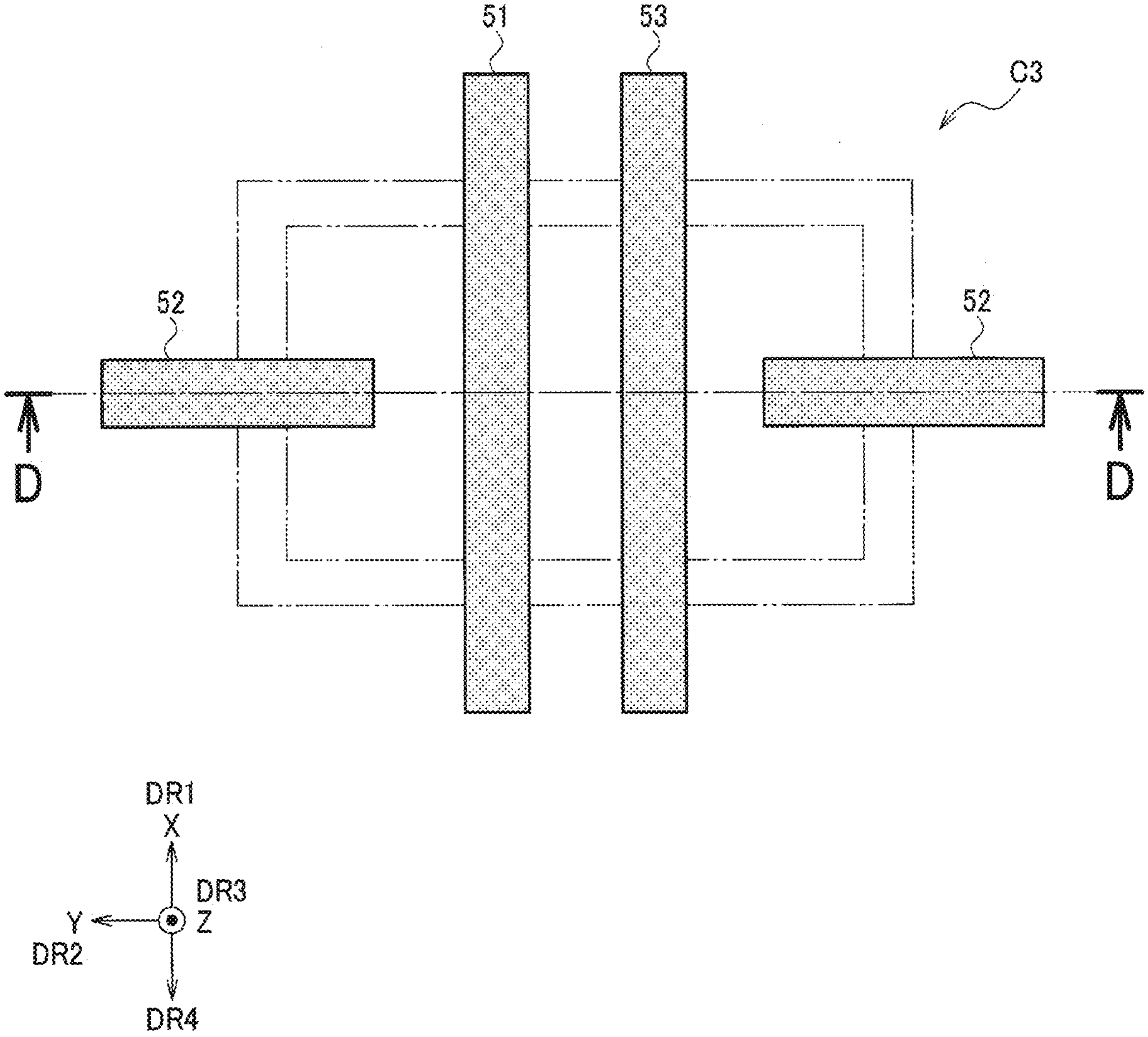
FIG. 8 is a diagram for explaining intersections between a first wiring line, a second wiring line, and a third wiring line.
Figure 9:
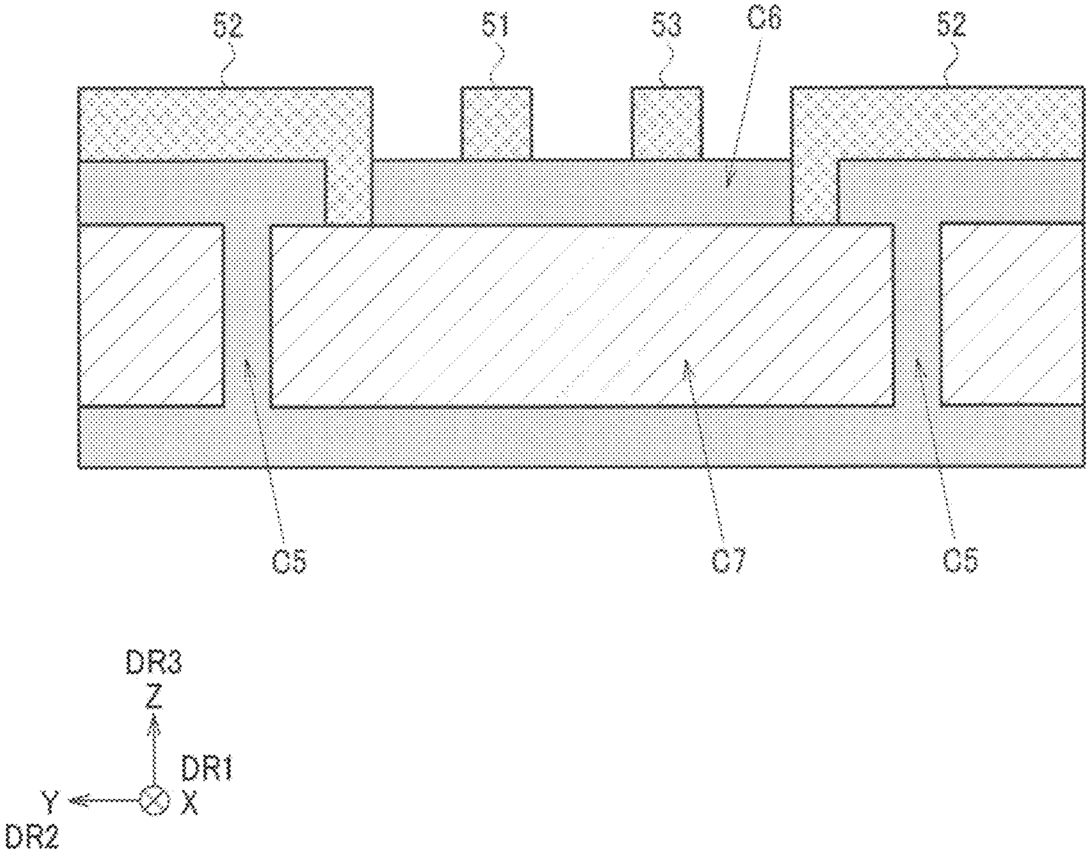
FIG. 9 is a diagram for explaining a cross-sectional surface along the line D-D shown in FIG. 8.

Further, as shown in FIG. 7, it is possible to further couple the second wiring lines 52 to a second stationary electrode terminal 72. Specifically, it is possible to adopt an example in which all of the first wiring line 51, the second wiring lines 52, and the third wiring line 53 are extracted to the outside of the movable body MB through the opening P. It should be noted that in this example, the second wiring lines 52 can cross the first wiring line 51 and the third wiring line 53 as indicated by C2 in FIG. 7, but the second wiring lines 52 are insulated from the first wiring line 51 and the third wiring line 53 as indicated by C3 in FIG. 8. It should be noted that more specifically, the area surrounded by dashed-two dotted lines in FIG. 8 is provided with a structure in which a groove is formed in the fifth direction DR5, and then, an insulating material is embedded in the groove as indicated by C5 in FIG. 9. Further, the second wiring lines 52 are insulated from the first wiring line 51 and the third wiring line 53 with that insulating material indicated by C6 located therebetween. Further, the second wiring lines 52 have contact with a layer indicated by C7 to thereby be electrically conducted. The layer indicated by C7 is a layer made of the same material as that of the movable body MB, namely a silicon layer. Thus, it is possible to extract the first wiring line 51, the second wiring lines 52, and the third wiring line 53 to the outside of the movable body MB without being shorted to each other.

Figure 10:
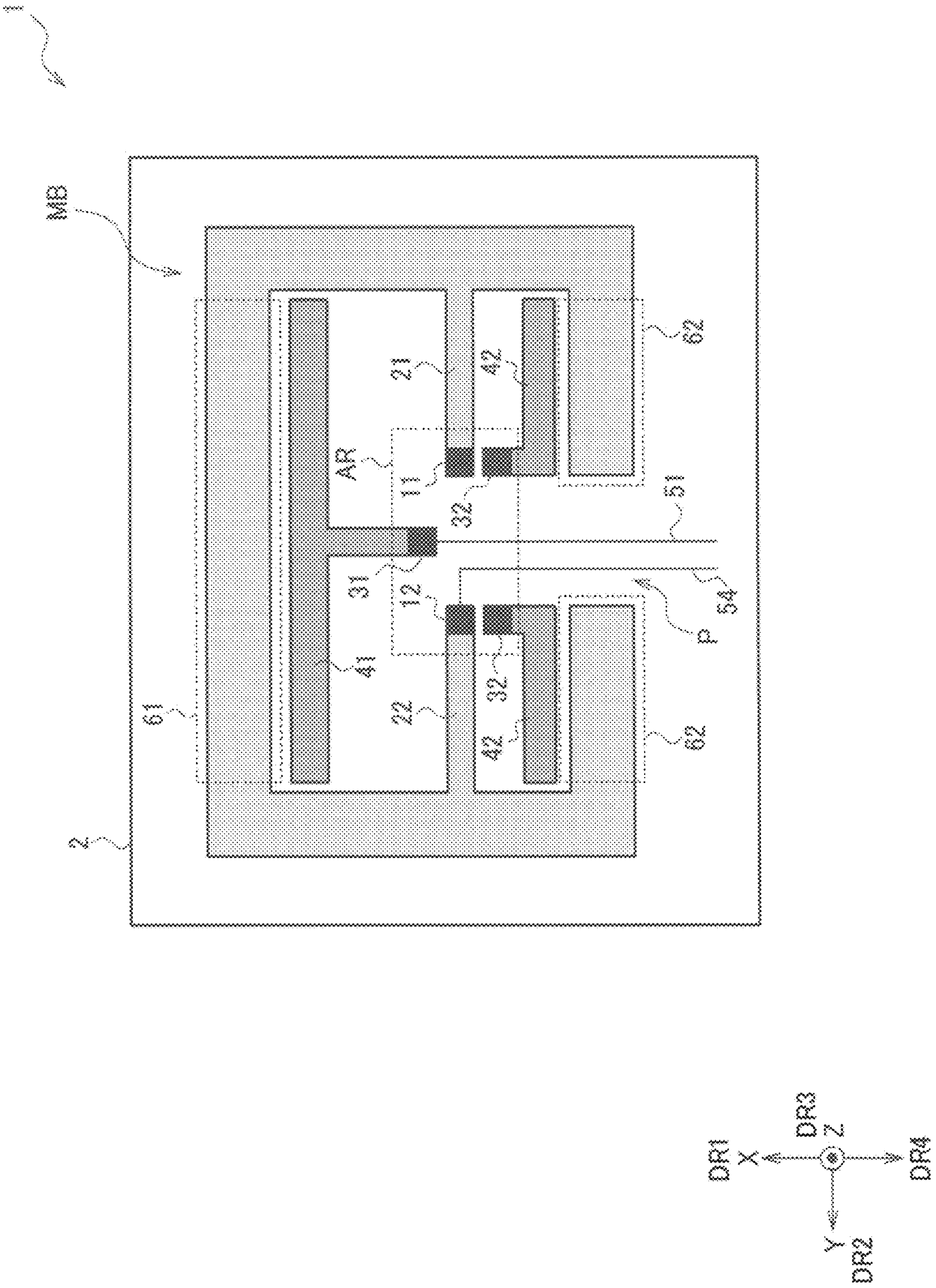
FIG. 10 is a plan view for explaining another example of the physical quantity sensor.

Further, as shown in FIG. 10, it is possible to arrange that the restoring force of the seesaw motion of the movable body MB is caused by the first support beam 21 and the second support beam 22. Similarly to the first support beam 21, the second support beam 22 is coupled to a second fixation part 12 at one end, and the movable body MB is coupled to the other end thereof. The second fixation part 12 is fixed to the substrate 2, and plays a role as the anchor in the seesaw motion of the movable body MB similarly to the first fixation part 11. In other words, the second fixation part 12 plays the role of coupling the movable body MB to the substrate 2 via the second support beam 22 similarly to the first fixation part 11.

Further, it is also possible to further arrange the second fixation part 12 in the fixation part arrangement area AR as shown in FIG. 10. Further, it is possible to arrange that one end of a fourth wiring line 54 is coupled to the second fixation part 12, and the fourth wiring line 54 is extracted to the outside of the movable body MB through the opening P. Further, although not shown in the drawings, it is possible to extract the other end of the fourth wiring line 54 to the outside of the movable body MB so as to be coupled to, for example, the movable electrode terminal 73 described above. In this case, due to the method shown in FIG. 8 and FIG. 9, the coupling between the fourth wiring line 54 and the movable electrode terminal 73 can be realized while being insulated from the first wiring line 51 and so on. As described above, the physical quantity sensor 1 according to the present embodiment includes the second fixation part 12 to be fixed to the substrate 2, the second support beam 22 which is coupled to the second fixation part 12 at the one end, and the other end of which is coupled to the movable body MB, and the fourth wiring line 54 to be coupled to the second fixation part 12. The second fixation part 12 is arranged in the fixation part arrangement area AR, and the fourth wiring line 54 is extracted from the second fixation part 12 to the outside of the movable body MB through the opening P. In this way, it is possible to increase the degree of freedom in designing the fourth wiring line 54, and at the same time, suppress the influence of the warpage of the substrate 2 caused in the second support beam 22. In other words, by the fixation parts of the stationary electrode units and the fixation parts of the movable electrode units being arranged in the fixation part arrangement area AR, it becomes possible to effectively suppress the influence of the warpage of the substrate 2.

Figure 11:
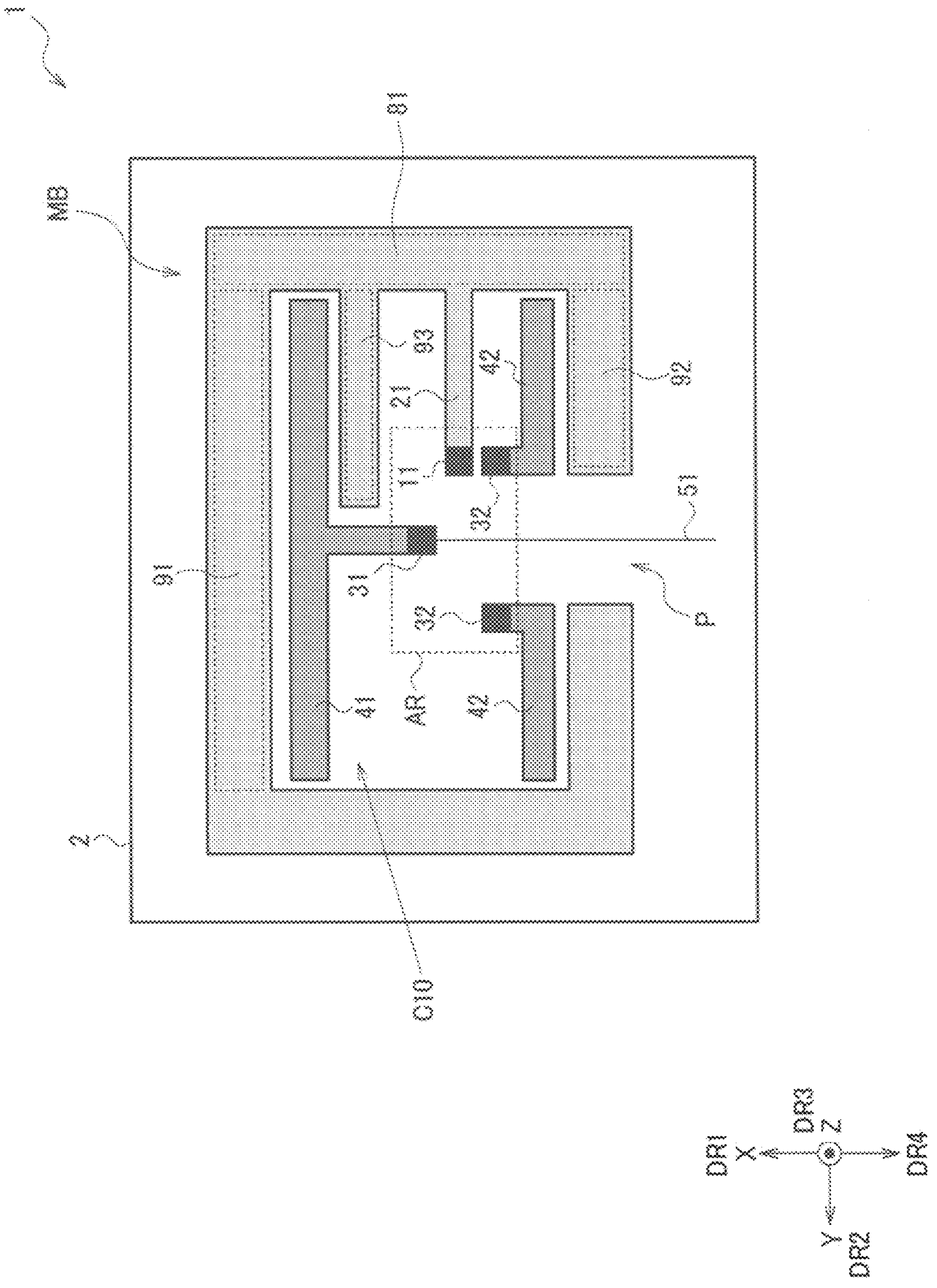
FIG. 11 is a plan view for explaining another example of the physical quantity sensor.

Further, as shown in, for example, FIG. 11, the movable body MB can further include a third base 93. The third base 93 is coupled to the first coupler 81, and extends along the second direction DR2 to be located at the fourth direction DR4 side of the first base 91. Further, it is possible to provide a movable electrode not shown formed along the third direction DR3 or the fifth direction DR5 to the third base 93, to thereby make the third base 93 function as the first movable electrode unit 61. As described above, in the physical quantity sensor 1 according to the present embodiment, the movable body MB is disposed at the first direction DR1 side of the first base 91, coupled to the first coupler 81, and extends along the second direction DR2, and includes the third base 93 provided with the movable electrode of the first movable electrode unit 61. In this way, the third base 93 becomes the mass part of the movable body, and thus, it is possible to increase the rotary torque of the first movable electrode unit 61. Thus, it is possible to make the physical quantity sensor 1 higher in sensitivity. It should be noted that although not shown in the drawings, it is possible to dispose substantially the same base as the third base 93 at the position indicated by C10. The position indicated by C10 is a position symmetrical to the third base 93 about the Y axis passing through the center in the Y direction of the movable body MB. In this case, the third base 93 seems to open, which does not matter. This is because the third base 93 is an auxiliary constituent for increasing the rotary torque of the first movable electrode unit 61.

Figure 12:
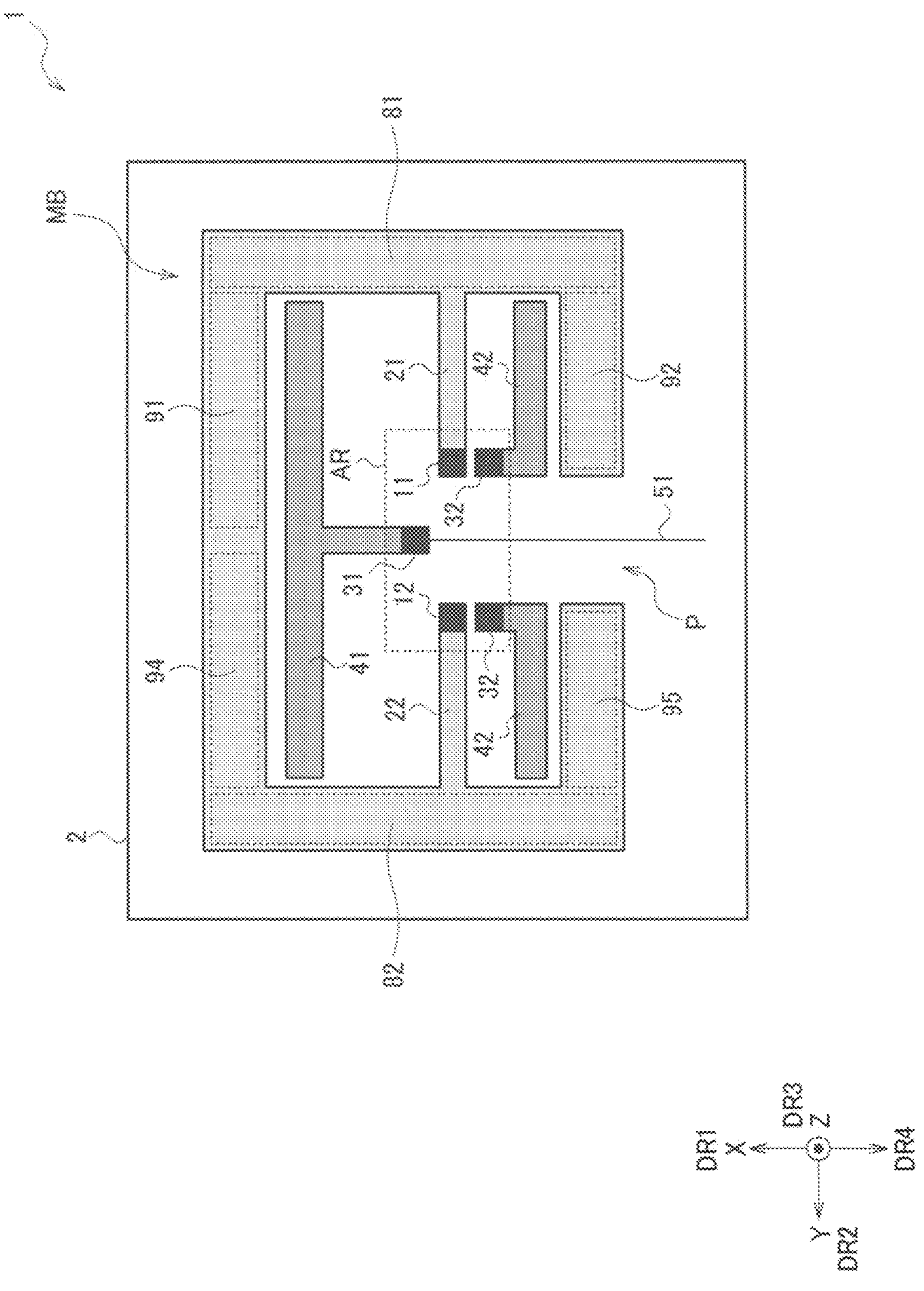
FIG. 12 is a plan view for explaining another example of the physical quantity sensor.

Further, it is possible for the movable body MB of the physical quantity sensor 1 according to the present embodiment to adopt a structure in which a portion extending along the first direction and the second support beam 22 are coupled to each other. Specifically, as shown in FIG. 12, one end of the second support beam 22 is coupled to the second fixation part 12, and the other end thereof is coupled to a second coupler 82. The second coupler 82 extends along the first direction DR1, and is coupled to a fourth base 94 at the first direction DR1 side of the second support beam 22, and is coupled to a fifth base 95 at the fourth direction DR4 side of the second support beam 22. The first base 91 described above and the fourth base 94 are integrated with each other at the first direction RD1 side of the second support beam 22, and perform the seesaw motion. In contrast, the second base 92 described above and the fifth base 95 are not integrated with each other, but the opening P is disposed between the second base 92 and the fifth base 95. In other words, the second base 92 and the fifth base 95 separately perform the seesaw motions as the second movable electrode units 62.

As described above, the physical quantity sensor 1 according to the present embodiment includes the second fixation part 12 to be fixed to the substrate 2 and the second support beam 22 one end of which is coupled to the second fixation part 12, and the other end of which is coupled to the movable body MB, the movable body MB includes the first coupler 81, the second coupler 82, the first base 91, the second base 92, the fourth base 94, and the fifth base 95, and the opening P of the movable body MB is disposed between the second base 92 and the fifth base 95. The first coupler 81 is coupled to the other end of the first support beam 21, and extends along the first direction DR1. The second coupler 82 is coupled to the other end of the second support beam 22, and extends along the first direction DR1. The first base 91 is disposed at the first direction DR1 side of the first support beam 21, coupled to the first coupler 81, and extends along the second direction DR2, and is provided with the movable electrode of the first movable electrode unit 61. The second base 92 is disposed at the fourth direction DR4 side of the first support beam 21, coupled to the first coupler 81, and extends along the second direction DR2, and is provided with the movable electrode of the second movable electrode unit 62. The fourth base 94 is disposed at the first direction DR1 side of the second support beam 22, coupled to the second coupler 82, and extends along the second direction DR2, and is provided with the movable electrode of the first movable electrode unit 61. The fifth base 95 is disposed at the fourth direction DR4 side of the second support beam 22, coupled to the second coupler 82, and extends along the second direction DR2, and is provided with the movable electrode of the second movable electrode unit 62. In this way, it is possible to form the movable body MB in which the fourth base 94 and the fifth base 95 are coupled to the second support beam 22 via the second coupler 82, make the fourth base 94 function as the first movable electrode unit 61, and make the fifth base 95 function as the second movable electrode unit 62.

Further, it is possible to provide the first movable electrode unit 61 with the comb-tooth structure to function. Specifically, as indicated by C21 in FIG. 13, a plurality of comb-tooth portions further extending along the fourth direction DR4 from the first base 91 is disposed, and the movable electrode is disposed on side surfaces of those comb-tooth portions. Further, the first stationary electrode unit 41 is provided with a comb-tooth structure along the first direction DR1 so as to correspond to those comb-tooth portions, and the stationary electrode is disposed on side surfaces of comb-tooth portions of the comb-tooth structure. Thus, the stationary electrode of the first stationary electrode unit 41 and the movable electrode of the first movable electrode unit 61 are opposed to each other in the Y-axis direction, namely the second direction DR2, to thereby function as the probe electrodes. Similarly, as indicated by C22 in FIG. 13, it is possible to provide the second stationary electrode unit 42 and the second movable electrode unit 62 with the comb-tooth structure to function. In this case, there is disposed a plurality of comb-tooth portions further extending along the first direction DR1 from the second base 92. It should be noted that the number of comb teeth is not limited to the number shown in FIG. 13, and can arbitrarily be adjusted. As described above, in the physical quantity sensor 1 according to the present embodiment, the movable electrode of the first movable electrode unit 61 extends from the first base 91 along the fourth direction DR4, and is opposed to the stationary electrode of the first stationary electrode unit 41 in the second direction DR2. The movable electrode of the second movable electrode unit 62 extends from the second base 92 along the first direction DR1, and is opposed to the stationary electrode of the second stationary electrode unit 42 in the second direction DR2. In this way, it is possible to increase the area of the movable electrode of the first movable electrode unit 61 opposed to the stationary electrode of the first stationary electrode unit 41. Similarly, it is possible to increase the area of the movable electrode of the second movable electrode unit 62 opposed to the stationary electrode of the second stationary electrode unit 42.

Figure 14:
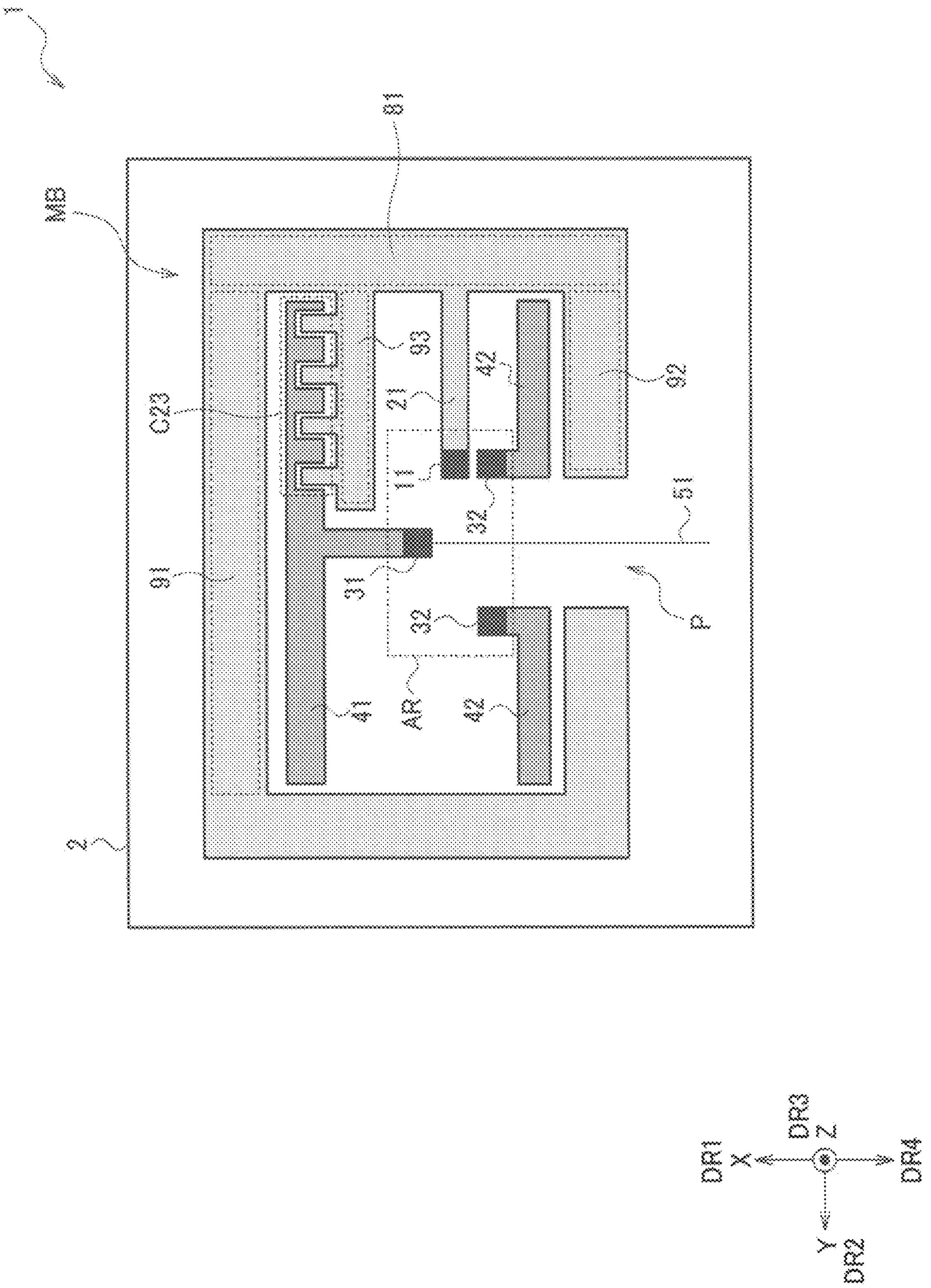
FIG. 14 is a plan view for explaining another example of the physical quantity sensor.

Further, as indicated by C23 in FIG. 14, it is possible to provide the third base 93 described above with the comb-tooth structure. In this case, there is disposed a plurality of comb-tooth portions further extending along the first direction DR1 from the third base 93. It should be noted that the number of comb teeth is not limited to the number shown in FIG. 14, and can arbitrarily be adjusted. As described above, in the physical quantity sensor 1 according to the present embodiment, the movable electrode of the first movable electrode unit 61 extends from the third base 93 along the first direction DR1, and is opposed to the stationary electrode of the first stationary electrode unit 41 in the second direction. In this way, it is possible to further increase the area of the movable electrode of the first movable electrode unit 61 opposed to the stationary electrode of the first stationary electrode unit 41.

Figure 13:
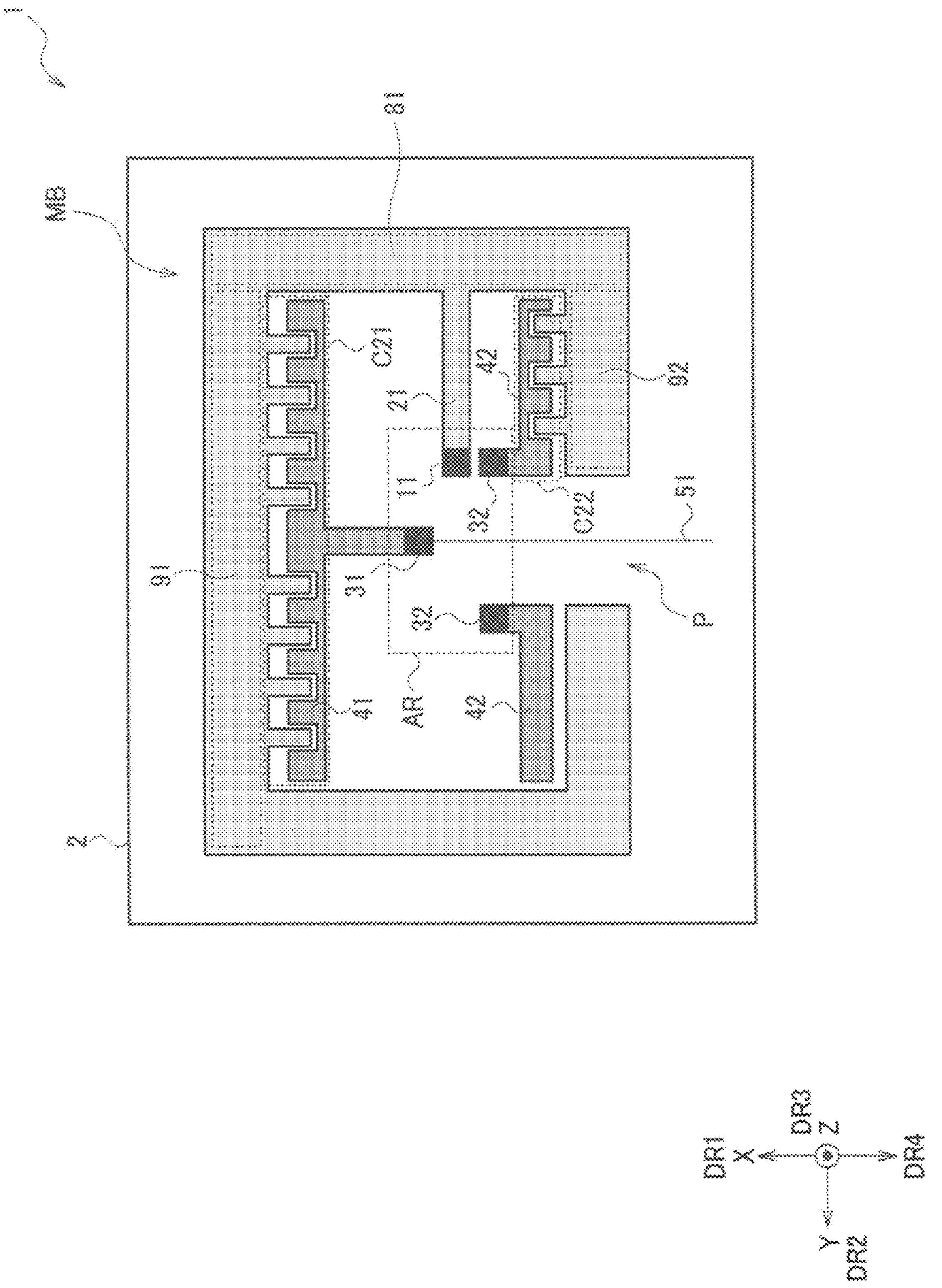
FIG. 13 is a plan view for explaining another example of the physical quantity sensor.
Figure 15:
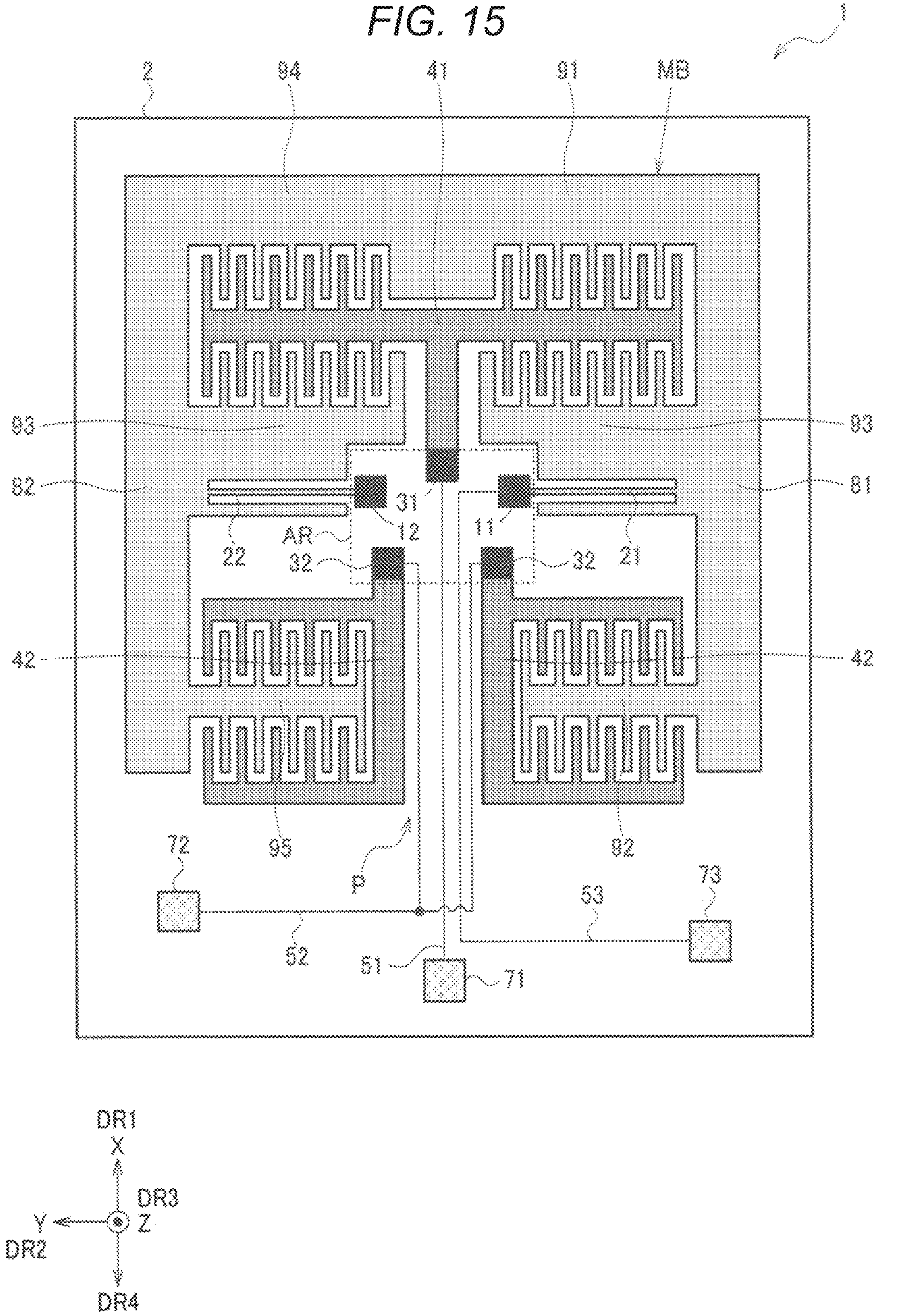
FIG. 15 is a plan view for explaining another example of the physical quantity sensor.

Further, the methods described with reference to FIG. 1 through FIG. 14 can arbitrarily be combined with each other. For example, it is possible to include the third base 93 shown in FIG. 11 in an example shown in FIG. 12. Further, for example, FIG. 12 and FIG. 13 are combined with each other to thereby achieve the function as the second movable electrode unit 62 constituted by the fifth base 95 and the comb-tooth structure. Further, the feature of FIG. 7 is further combined therewith to thereby form such a physical quantity sensor 1 as shown in FIG. 15.

Figure 16:
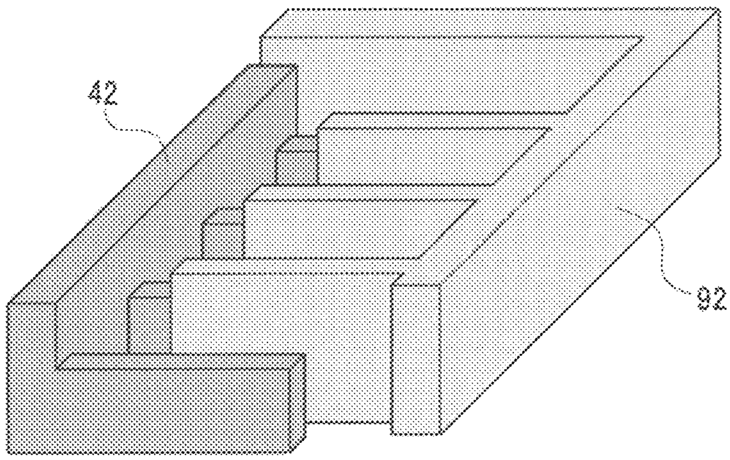
FIG. 16 is a diagram for explaining an example of a thickness relationship between a second stationary electrode and a second movable electrode.
Figure 16:
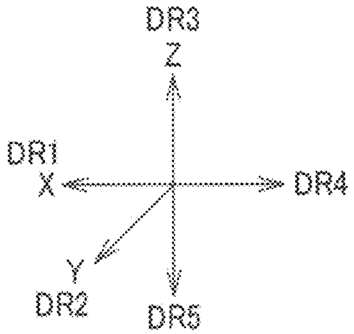

Further, the method of the present embodiment is not limited to the above. For example, it is assumed that the thickness of the first stationary electrode unit 41 and the thickness of the first movable electrode unit 61 do not particularly matter, but it is possible to provide a certain relationship. The certain relationship is, for example, making one thickness thicker than the other thickness, or making the both parties the same in position of the end portion. Similarly, it is assumed that the thickness of the second stationary electrode unit 42 and the thickness of the second movable electrode unit 62 do not particularly matter, but it is possible to provide a certain relationship. It should be noted that when the second stationary electrode unit 42 and the second movable electrode unit 62 have the comb-tooth structures as shown in, for example, FIG. 13, it is possible to make the thickness of the second movable electrode unit 62 relatively thicker than the thickness of the second stationary electrode unit 42 by etching the comb-tooth portions of the second stationary electrode unit 42 as shown in FIG. 16.

Figure 17:
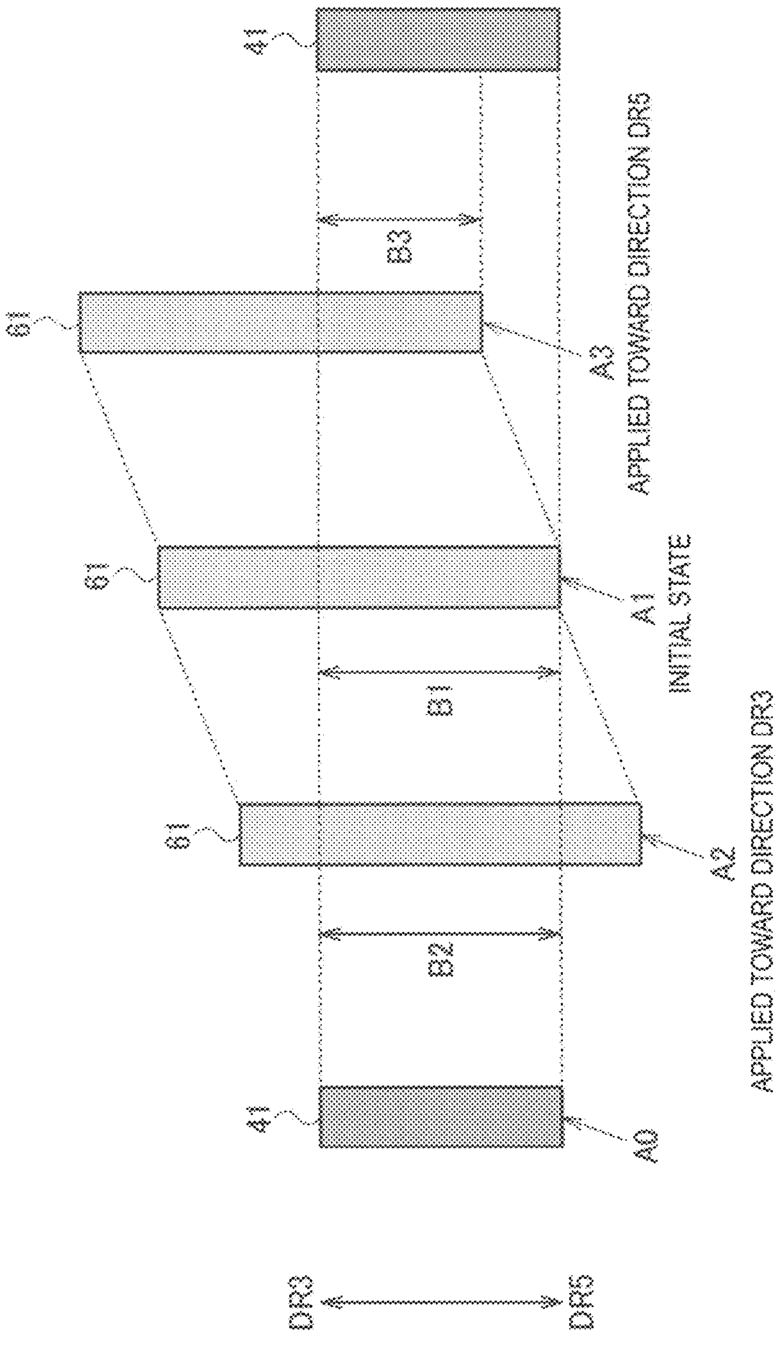
FIG. 17 is a diagram for explaining an example of a relationship between a motion of a first movable electrode and a first stationary electrode.

FIG. 17 is a diagram for explaining an example of a change in positional relationship between the first stationary electrode unit 41 and the first movable electrode unit 61 in the third direction DR3 due to the seesaw motion of the movable body MB. It should be noted that in FIG. 17, the fifth direction DR5 side can also be said to be a reverse surface side. The same applies also to FIG. 18 and subsequent drawings. As indicated by A0 and A1 in FIG. 17, in an initial state, the first stationary electrode unit 41 and the first movable electrode unit 61 coincide with each other in the position of the end portion at the fifth direction DR5 side. Further, the thickness in the third direction DR3 of the first movable electrode unit 61 is larger than the thickness in the third direction DR3 of the first stationary electrode unit 41. Therefore, the position of the end portion in the third direction DR3 of the first movable electrode unit 61 is located at the third direction DR3 side of the position of the end portion in the third direction DR3 of the first stationary electrode unit 41.

For example, when the acceleration in the third direction DR3 is applied in the initial state, the first movable electrode unit 61 is displaced toward the fifth direction DR5 as indicated by A2. On the other hand, when the acceleration in the fifth direction DR5 is applied in the initial state, the first movable electrode unit 61 is displaced toward the third direction DR3 as indicated by A3. When comparing B1 and B2 with each other, it is understood that when the acceleration in the third direction DR3 is applied in the initial state, the area in which the first stationary electrode unit 41 and the first movable electrode unit 61 are opposed to each other is kept. Meanwhile, when comparing B1 and B3 with each other, it is understood that when the acceleration in the fifth direction DR5 is applied in the initial state, the area in which the first stationary electrode unit 41 and the first movable electrode unit 61 are opposed to each other decreases. In other words, in an example shown in FIG. 17, it is arranged that when the acceleration toward the fifth direction DR5 occurs, it is possible to detect the physical quantity in the fifth direction DR5 by detecting a change in physical quantity due to the decrease in the area in which the first stationary electrode unit 41 and the first movable electrode unit 61 are opposed to each other.

Figure 18:
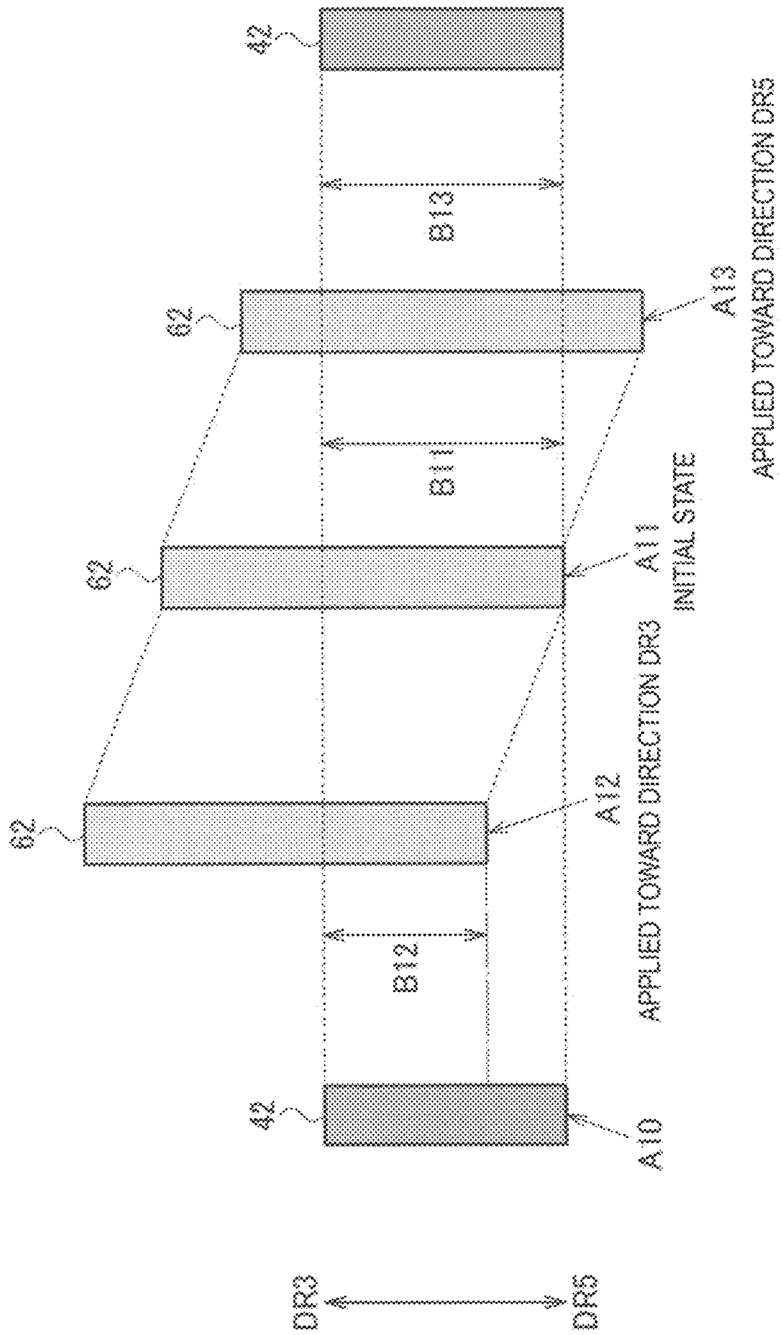
FIG. 18 is a diagram for explaining an example of a relationship between a motion of the second movable electrode and the second stationary electrode.

FIG. 18 is a diagram for explaining an example of the positional relationship in the third direction DR3 between the second stationary electrode unit 42 and the second movable electrode unit 62. As indicated by A10 and A11 in FIG. 18, in the initial state, the second stationary electrode unit 42 and the second movable electrode unit 62 coincide with each other in the position of the end portion at the fifth direction DR5 side. Further, the thickness in the third direction DR3 of the second movable electrode unit 62 is larger than the thickness in the third direction DR3 of the second stationary electrode unit 42. Therefore, the position of the end portion in the third direction DR3 of the second movable electrode unit 62 is located at the third direction DR3 side of the position of the end portion in the third direction DR3 of the second stationary electrode unit 42.

For example, when the acceleration in the third direction DR3 is applied in the initial state, the second movable electrode unit 62 is displaced toward the third direction DR3 as indicated by A12. On the other hand, when the acceleration in the fifth direction DR5 is applied in the initial state, the second movable electrode unit 62 is displaced toward the fifth direction DR5 as indicated by A13. When comparing B11 and B12 with each other, it is understood that when the acceleration in the third direction DR3 is applied in the initial state, the area in which the second stationary electrode unit 42 and the second movable electrode unit 62 are opposed to each other decreases. Meanwhile, when comparing B11 and B13 with each other, it is understood that when the acceleration in the fifth direction DR5 is applied in the initial state, the area in which the second stationary electrode unit 42 and the second movable electrode unit 62 are opposed to each other is kept. In other words, in an example shown in FIG. 18, it is arranged that when the acceleration toward the third direction DR3 occurs, it is possible to detect the physical quantity in the third direction DR3 by detecting a change in physical quantity due to the decrease in the area in which the second stationary electrode unit 42 and the second movable electrode unit 62 are opposed to each other.

As described above, in the physical quantity sensor 1 according to the present embodiment, the thickness in the third direction DR3 of the first movable electrode unit 61 is larger than the thickness in the third direction DR3 of the first stationary electrode unit 41, and the thickness in the third direction DR3 of the second movable electrode unit 62 is larger than the thickness in the third direction DR3 of the second stationary electrode unit 42. In this way, it is possible to detect the change in physical quantity in both of the third direction DR3 and the fifth direction DR5. Further, the first stationary electrode unit 41 and the first movable electrode unit 61 coincide with each other in the position in the third direction of the reverse surface, and the second stationary electrode unit 42 and the second movable electrode unit 62 coincide with each other in the position in the third direction of the reverse surface. In this way, by forming the first stationary electrode unit 41, the second stationary electrode 42, the first movable electrode unit 61, and the second movable electrode unit 62 with the same process of an electrode material constituting each of these electrode units, it is possible to realize the configuration in which the reverse surfaces of the probe electrodes are coplanar with each other. Thus, it is possible to make the manufacturing process easier.

Figure 19:
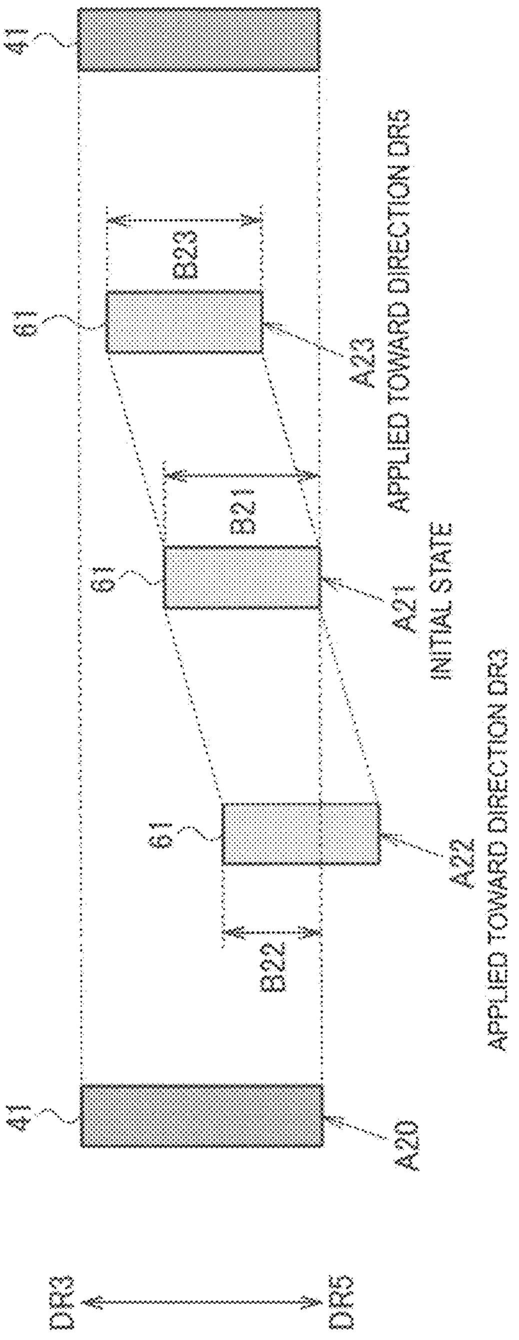
FIG. 19 is a diagram for explaining another example of the relationship between the motion of the first movable electrode and the first stationary electrode.

It should be noted that it is possible to set the thickness in the third direction DR3 of, and the positional relationship between, the first stationary electrode unit 41 and the first movable electrode unit 61 as in an example shown in FIG. 19. Similarly, it is possible to set the thickness in the third direction DR3 of, and the positional relationship between, the second stationary electrode unit 42 and the second movable electrode unit 62 as in an example shown in FIG. 20. The example shown in FIG. 19 is reversed from the example shown in FIG. 17 in the point that the thickness in the third direction DR3 of the first stationary electrode unit 41 is larger than the thickness in the third direction DR3 of the first movable electrode unit 61. Similarly, the example shown in FIG. 20 is reversed from the example shown in FIG. 18 in the point that the thickness in the third direction DR3 of the second stationary electrode unit 42 is larger than the thickness in the third direction DR3 of the second movable electrode unit 62.

As indicated by A20 and A21 in FIG. 19, the example shown in FIG. 19 is substantially the same as the example shown in FIG. 17 in the point that the first stationary electrode unit 41 and the first movable electrode unit 61 coincide with each other in the position of the end portion at the fifth direction DR5 side in the initial state. Further, the thickness in the third direction DR3 of the first stationary electrode unit 41 is larger than the thickness in the third direction DR3 of the first movable electrode unit 61 as described above. Therefore, the position of the end portion in the third direction DR3 of the first stationary electrode unit 41 is located at the third direction DR3 side of the position of the end portion in the third direction DR3 of the first movable electrode unit 61.

For example, when the acceleration in the third direction DR3 is applied in the initial state, the first movable electrode unit 61 is displaced toward the fifth direction DR5 as indicated by A22. On the other hand, when the acceleration in the fifth direction DR5 is applied in the initial state, the first movable electrode unit 61 is displaced toward the third direction DR3 as indicated by A23. When comparing B21 and B22 with each other, it is understood that when the acceleration in the third direction DR3 is applied in the initial state, the area in which the first stationary electrode unit 41 and the first movable electrode unit 61 are opposed to each other decreases. Meanwhile, when comparing B21 and B23 with each other, it is understood that when the acceleration in the fifth direction DR5 is applied in the initial state, the area in which the first stationary electrode unit 41 and the first movable electrode unit 61 are opposed to each other is kept. In other words, the example shown in FIG. 19 is different from the example shown in FIG. 17 in the point that it is arranged that when the acceleration toward the third direction DR3 occurs, it is possible to detect the physical quantity in the third direction DR3 by detecting a change in physical quantity due to the decrease in the area in which the first stationary electrode unit 41 and the first movable electrode unit 61 are opposed to each other.

Figure 20:
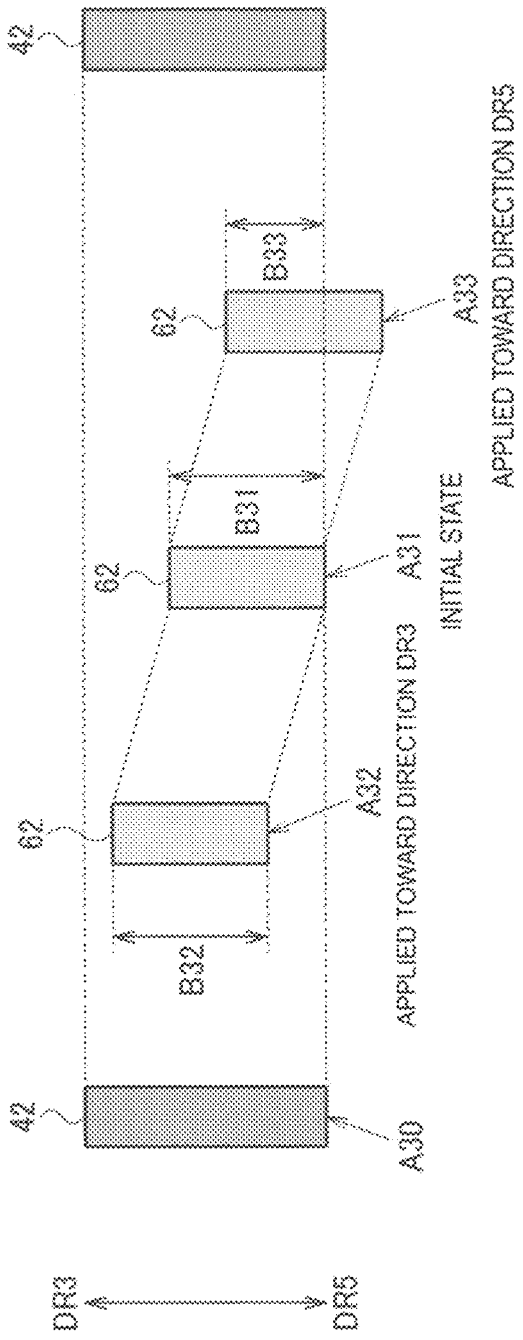
FIG. 20 is a diagram for explaining another example of the relationship between the motion of the second movable electrode and the second stationary electrode.

As indicated by A30 and A31 in FIG. 20, in the initial state, the second stationary electrode unit 42 and the second movable electrode unit 62 coincide with each other in the position of the end portion at the fifth direction DR5 side. Further, the thickness in the third direction DR3 of the second stationary electrode unit 42 is larger than the thickness in the third direction DR3 of the second movable electrode unit 62 as described above. Therefore, the position of the end portion in the third direction DR3 of the second stationary electrode unit 42 is located at the third direction DR3 side of the position of the end portion in the third direction DR3 of the second movable electrode unit 62.

For example, when the acceleration in the third direction DR3 is applied in the initial state, the second movable electrode unit 62 is displaced toward the third direction DR3 as indicated by A32. On the other hand, when the acceleration in the fifth direction DR5 is applied in the initial state, the second movable electrode unit 62 is displaced toward the fifth direction DR5 as indicated by A33. When comparing B31 and B32 with each other, it is understood that when the acceleration in the third direction DR3 is applied in the initial state, the area in which the second stationary electrode unit 42 and the second movable electrode unit 62 are opposed to each other is kept. Meanwhile, when comparing B31 and B33 with each other, it is understood that when the acceleration in the fifth direction DR5 is applied in the initial state, the area in which the second stationary electrode unit 42 and the second movable electrode unit 62 are opposed to each other decreases. In other words, the example shown in FIG. 20 is different from the example shown in FIG. 18 in the point that it is arranged that when the acceleration toward the fifth direction DR5 occurs, it is possible to detect the physical quantity in the fifth direction DR5 by detecting a change in physical quantity due to the decrease in the area in which the second stationary electrode unit 42 and the second movable electrode unit 62 are opposed to each other.

Figure 21:
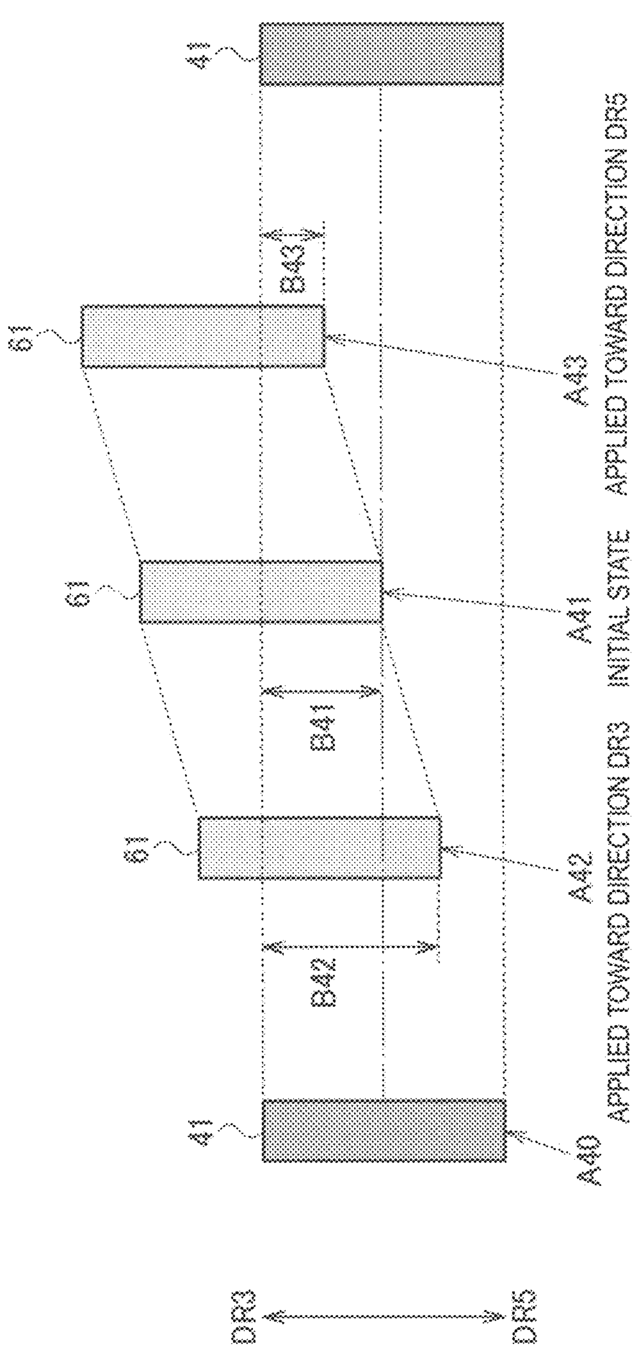
FIG. 21 is a diagram for explaining another example of the relationship between the motion of the first movable electrode and the first stationary electrode.

Further, it is possible to set the thickness in the third direction DR3 of, and the positional relationship between, the first stationary electrode unit 41 and the first movable electrode unit 61 as in an example shown in FIG. 21. Similarly, it is possible to set the thickness in the third direction DR3 of, and the positional relationship between, the second stationary electrode unit 42 and the second movable electrode unit 62 as in an example shown in FIG. 22.

As indicated by A40 and A41 in FIG. 21, in the initial state, the first stationary electrode unit 41 and the first movable electrode unit 61 are made different in the position of the end portion at the fifth direction DR5 side from each other. Further, the first stationary electrode unit 41 and the first movable electrode unit 61 are also made different in the position of the end portion at the third direction DR3 side from each other.

For example, when the acceleration in the third direction DR3 is applied in the initial state, the first movable electrode unit 61 is displaced toward the fifth direction DR5 as indicated by A42. On the other hand, when the acceleration in the fifth direction DR5 is applied in the initial state, the first movable electrode unit 61 is displaced toward the third direction DR3 as indicated by A43. When comparing B41 and B42 with each other, it is understood that when the acceleration in the third direction DR3 is applied in the initial state, the area in which the first stationary electrode unit 41 and the first movable electrode unit 61 are opposed to each other increases. Meanwhile, when comparing B41 and B43 with each other, it is understood that when the acceleration in the fifth direction DR5 is applied in the initial state, the area in which the first stationary electrode unit 41 and the first movable electrode unit 61 are opposed to each other decreases. In other words, the example shown in FIG. 21 is different from the examples shown in FIG. 17 and FIG. 19 in the point that it is arranged that when the acceleration toward either one of the third direction DR3 and the fifth direction DR5 occurs, it is possible to detect a change in the physical quantity due to a change in the area in which the first stationary electrode unit 41 and the first movable electrode unit 61 are opposed to each other. In other words, it can be said that the example shown in FIG. 21 is high in detection sensitivity compared to the examples shown in FIG. 17 and FIG. 19.

Figure 22:
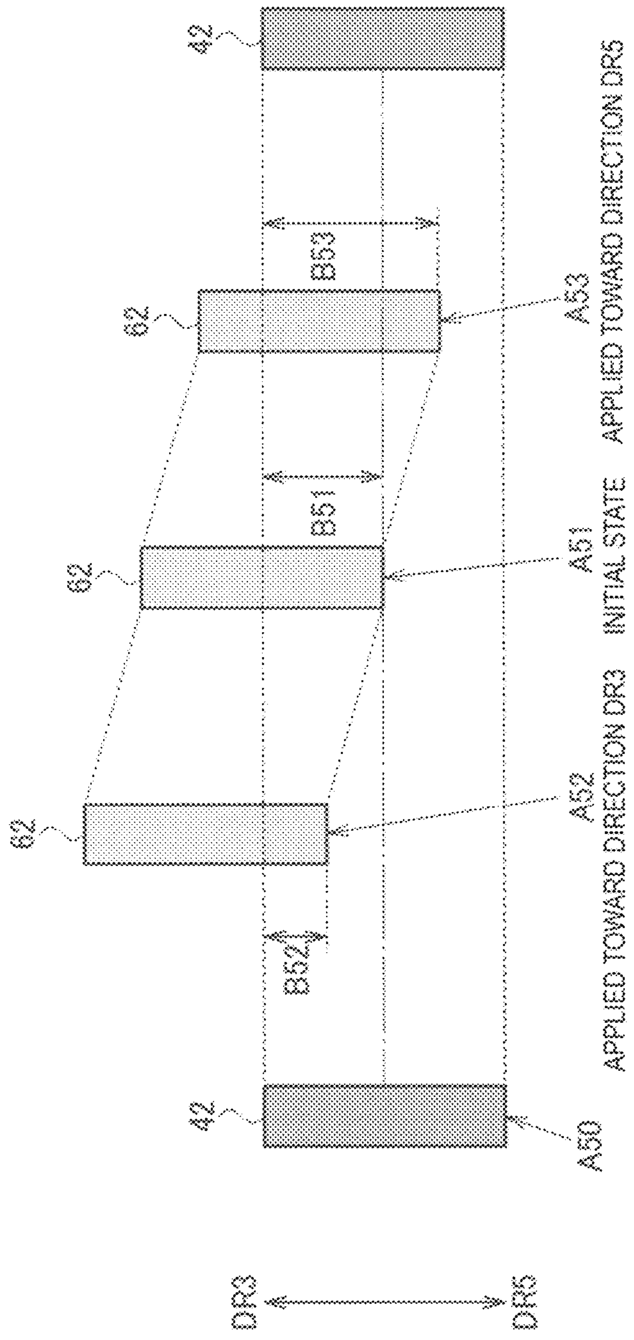
FIG. 22 is a diagram for explaining another example of the relationship between the motion of the second movable electrode and the second stationary electrode.

As indicated by A50 and A51 in FIG. 22, in the initial state, the second stationary electrode unit 42 and the second movable electrode unit 62 are made different in the position of the end portion at the fifth direction DR5 side from each other. Further, the second stationary electrode unit 42 and the second movable electrode unit 62 are also made different in the position of the end portion at the third direction DR3 side from each other.

For example, when the acceleration in the third direction DR3 is applied in the initial state, the second movable electrode unit 62 is displaced toward the third direction DR3 as indicated by A52. On the other hand, when the acceleration in the fifth direction DR5 is applied in the initial state, the second movable electrode unit 62 is displaced toward the fifth direction DR5 as indicated by A53. When comparing B51 and B52 with each other, it is understood that when the acceleration in the third direction DR3 is applied in the initial state, the area in which the second stationary electrode unit 42 and the second movable electrode unit 62 are opposed to each other decreases. Meanwhile, when comparing B51 and B53 with each other, it is understood that when the acceleration in the fifth direction DR5 is applied in the initial state, the area in which the second stationary electrode unit 42 and the second movable electrode unit 62 are opposed to each other increases. In other words, the example shown in FIG. 22 is different from the examples shown in FIG. 18 and FIG. 20 in the point that it is arranged that when the acceleration toward either one of the third direction DR3 and the fifth direction DR5 occurs, it is possible to detect a change in the physical quantity due to a change in the area in which the second stationary electrode unit 42 and the second movable electrode unit 62 are opposed to each other. In other words, it can be said that the example shown in FIG. 22 is high in detection sensitivity compared to the examples shown in FIG. 18 and FIG. 20.

Figure 23:
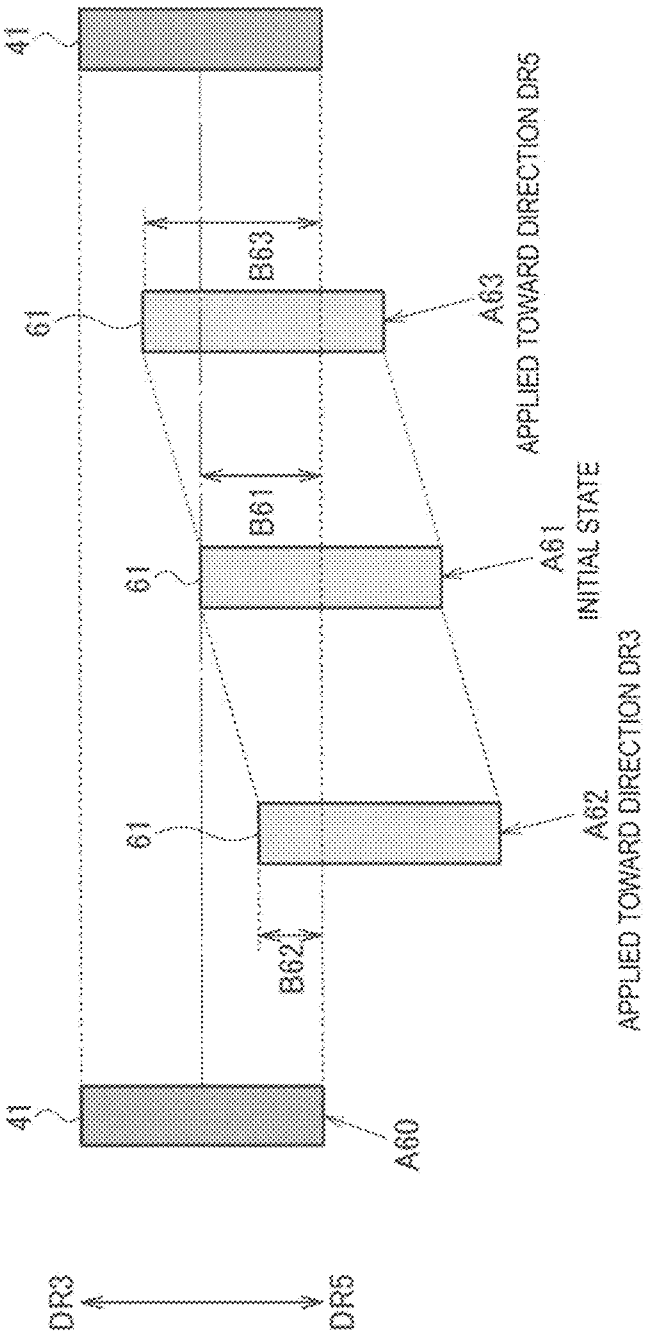
FIG. 23 is a diagram for explaining another example of the relationship between the motion of the first movable electrode and the first stationary electrode.

Further, it is possible to set the thickness in the third direction DR3 of, and the positional relationship between, the first stationary electrode unit 41 and the first movable electrode unit 61 as in an example shown in FIG. 23. Similarly, it is possible to set the thickness in the third direction DR3 of, and the positional relationship between, the second stationary electrode unit 42 and the second movable electrode unit 62 as in an example shown in FIG. 24. Compared to the example shown in FIG. 21, the example shown in FIG. 23 is different in the point that the first stationary electrode unit 41 and the first movable electrode unit 61 are turned upside down. Similarly, when compared to the example shown in FIG. 22, the example shown in FIG. 24 is different in the point that the second stationary electrode unit 42 and the second movable electrode unit 62 are turned upside down.

In FIG. 23, for example, when the acceleration in the third direction DR3 is applied in the initial state, the first movable electrode unit 61 is displaced toward the fifth direction DR5 as indicated by A62. On the other hand, when the acceleration in the fifth direction DR5 is applied in the initial state, the first movable electrode unit 61 is displaced toward the third direction DR3 as indicated by A63. When comparing B61 and B62 with each other, it is understood that when the acceleration in the third direction DR3 is applied in the initial state, the area in which the first stationary electrode unit 41 and the first movable electrode unit 61 are opposed to each other decreases. Meanwhile, when comparing B61 and B63 with each other, it is understood that when the acceleration in the fifth direction DR5 is applied in the initial state, the area in which the first stationary electrode unit 41 and the first movable electrode unit 61 are opposed to each other increases. In other words, the point that it is arranged that when the acceleration toward either one of the third direction DR3 and the fifth direction DR5 occurs, it is possible to detect a change in the physical quantity due to a change in the area in which the first stationary electrode unit 41 and the first movable electrode unit 61 are opposed to each other is common to the example shown in FIG. 23 and the example shown in FIG. 21.

Figure 24:
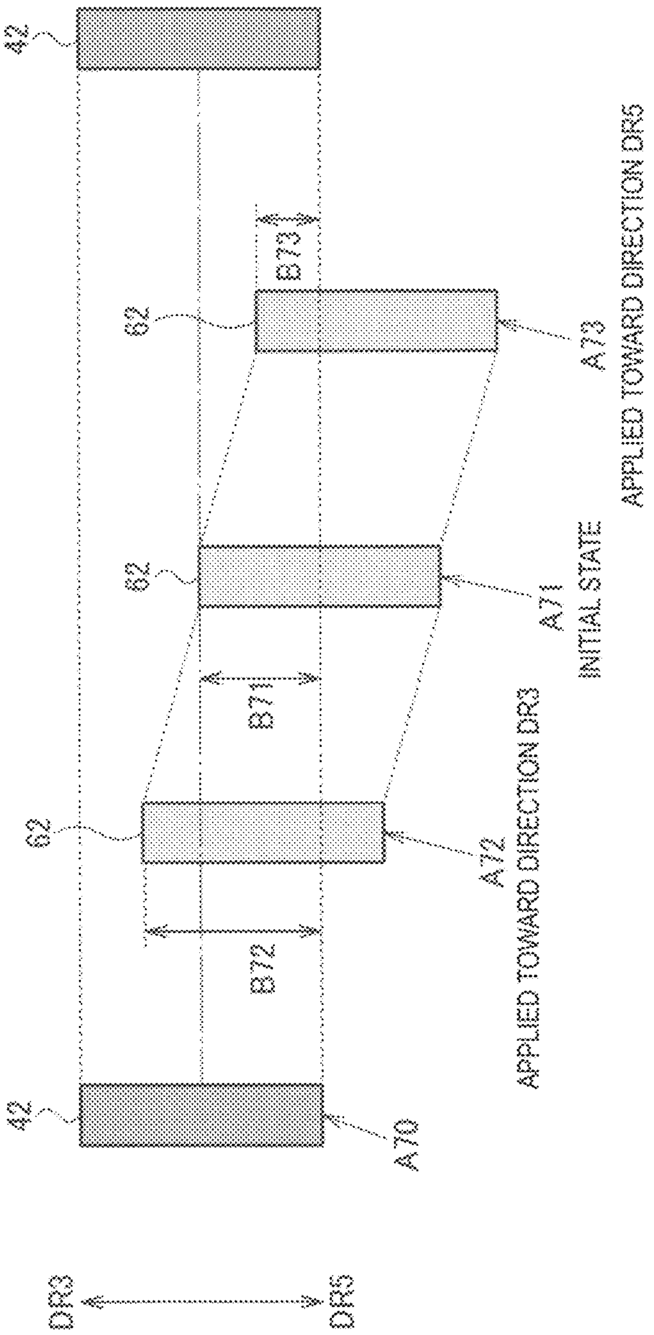
FIG. 24 is a diagram for explaining another example of the relationship between the motion of the second movable electrode and the second stationary electrode.

In FIG. 24, when the acceleration in the third direction DR3 is applied in the initial state, the second movable electrode unit 62 is displaced toward the third direction DR3 as indicated by A72. On the other hand, when the acceleration in the fifth direction DR5 is applied in the initial state, the second movable electrode unit 62 is displaced toward the fifth direction DR5 as indicated by A73. When comparing B71 and B72 with each other, it is understood that when the acceleration in the third direction DR3 is applied in the initial state, the area in which the second stationary electrode unit 42 and the second movable electrode unit 62 are opposed to each other increases. Meanwhile, when comparing B71 and B73 with each other, it is understood that when the acceleration in the fifth direction DR5 is applied in the initial state, the area in which the second stationary electrode unit 42 and the second movable electrode unit 62 are opposed to each other decreases. In other words, the point that it is arranged that when the acceleration toward either one of the third direction DR3 and the fifth direction DR5 occurs, it is possible to detect a change in the physical quantity due to a change in the area in which the second stationary electrode unit 42 and the second movable electrode unit 62 are opposed to each other is common to the example shown in FIG. 24 and the example shown in FIG. 22.

As described above, by adopting such examples as shown in FIG. 21 through FIG. 24, it is possible to further increase the detection sensitivity, and at the same time, it is possible to further widen a variation on a detector.

Figure 25:
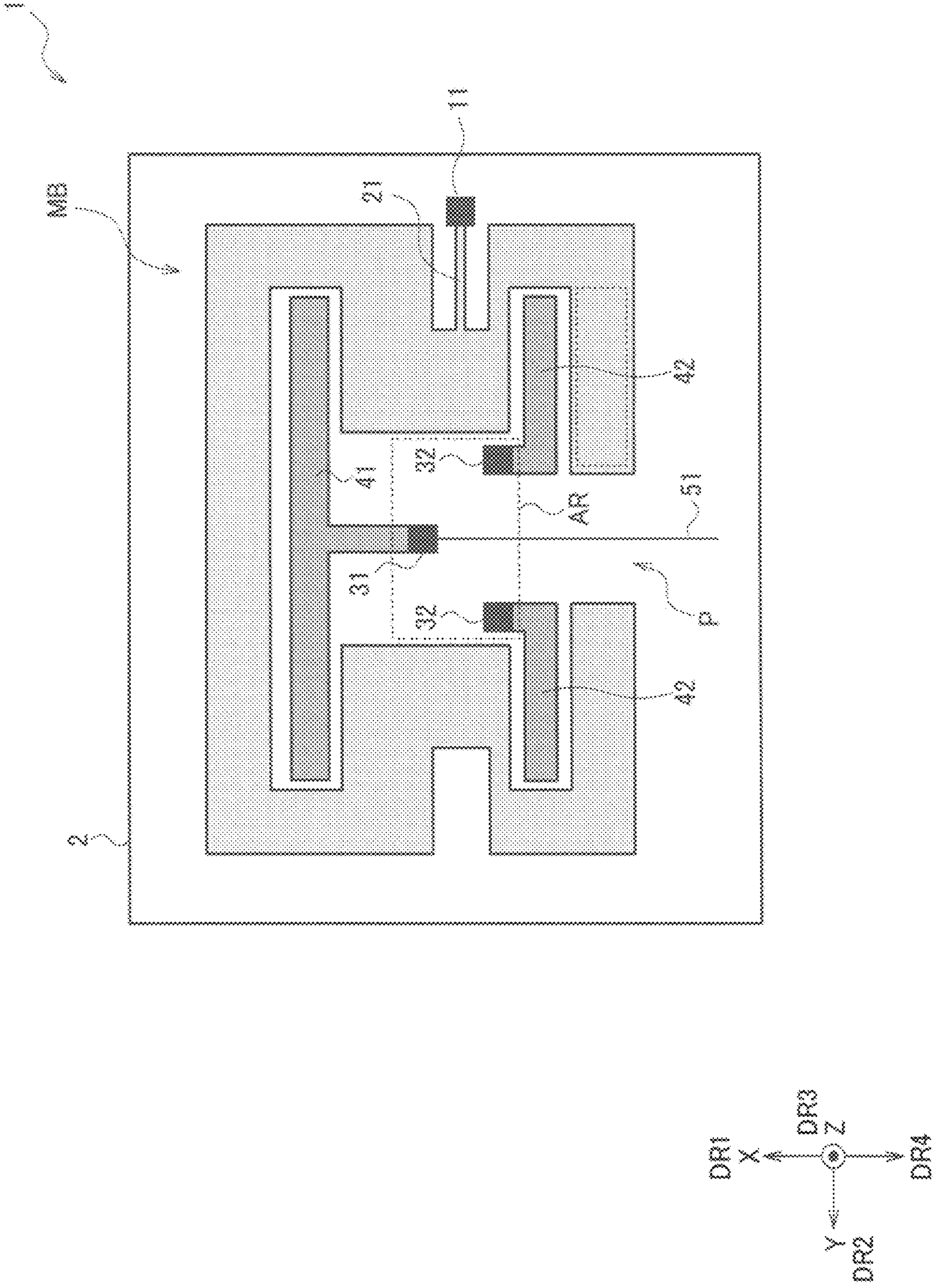
FIG. 25 is a plan view for explaining another example of the physical quantity sensor.
Figure 26:
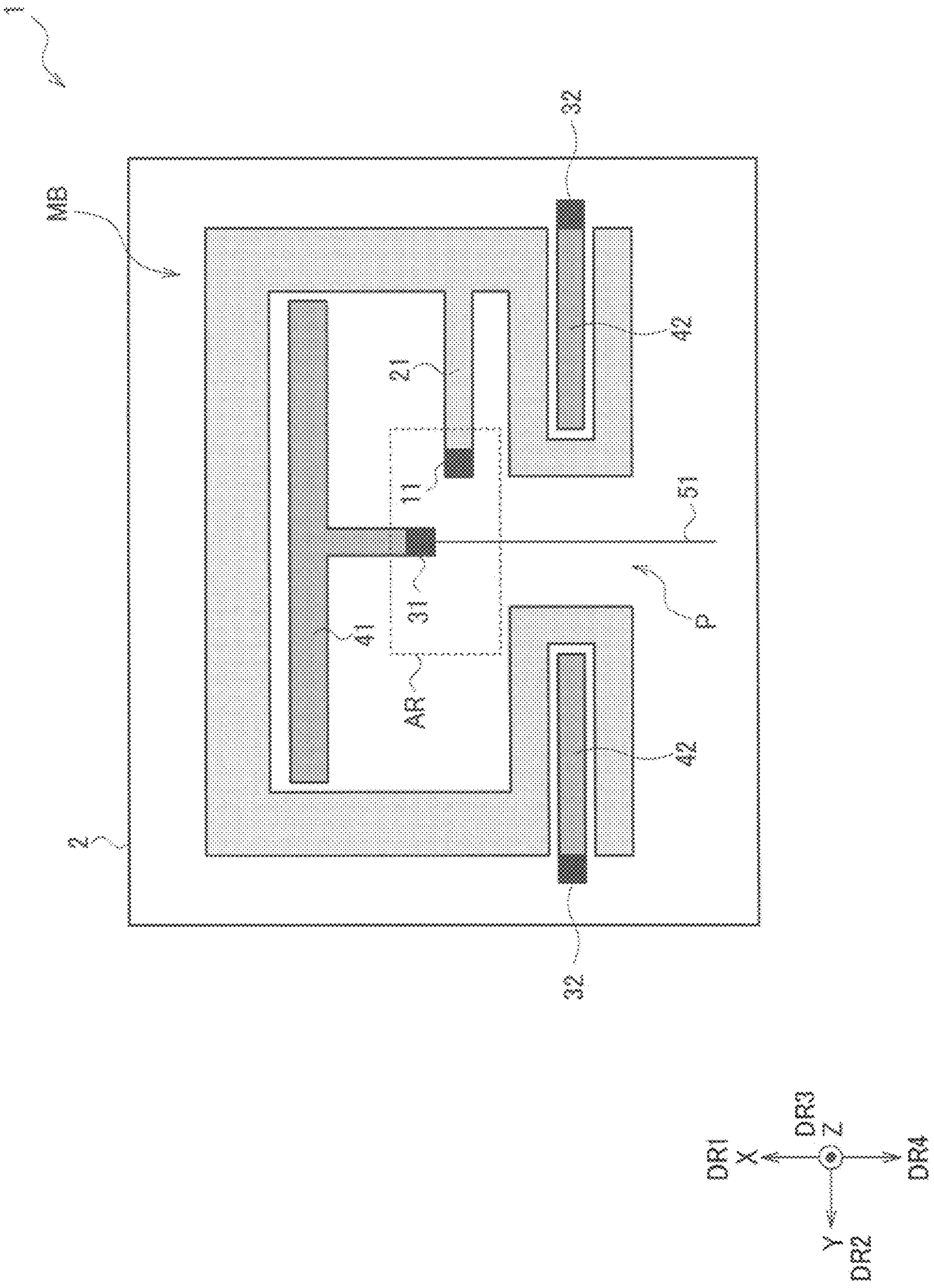
FIG. 26 is a plan view for explaining another example of the physical quantity sensor.

Further, as shown in, for example, FIG. 25, it is possible to adopt a configuration example in which the first fixation part 11 is arranged outside the movable body MB in the planar view in a direction perpendicular to the substrate 2. It should be noted that although not shown in the drawings, when the physical quantity sensor 1 further includes the second support beam 22, it is possible to adopt a configuration example in which the second fixation part 12 is arranged outside the movable body MB. Further, as shown in, for example, FIG. 26, it is possible to adopt a configuration example in which the second stationary electrode fixation part 32 is arranged outside the movable body MB in the planar view in a direction perpendicular to the substrate 2. Further, although not shown in the drawings, it is possible to combine the example shown in FIG. 25 and the example shown in FIG. 26 with each other to form a configuration example in which all of the first fixation part 11, the second fixation part 12, and the second stationary electrode fixation part 32 are arranged outside the movable body MB.

Figure 27:
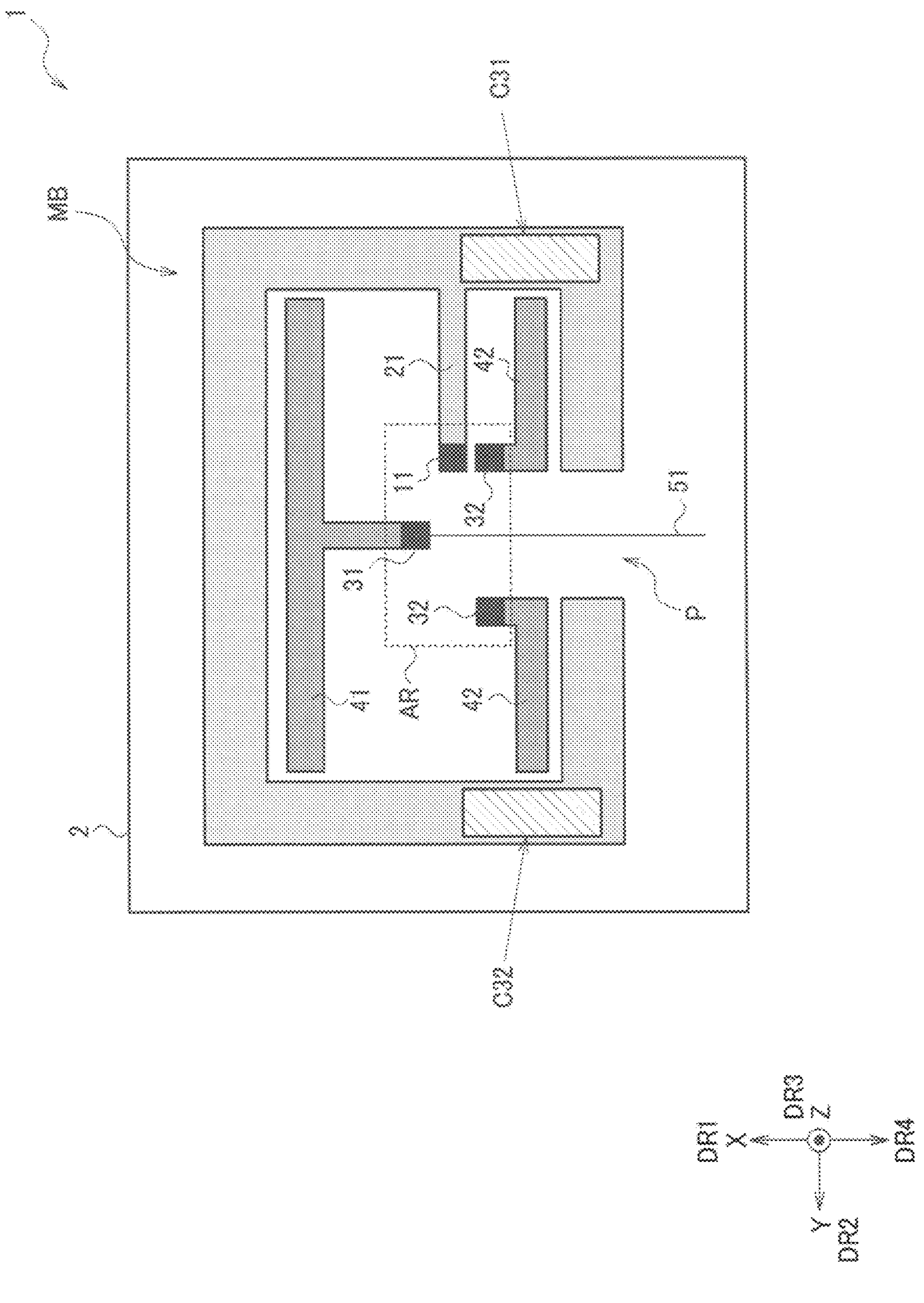
FIG. 27 is a plan view for explaining another example of the physical quantity sensor.
Figure 28:
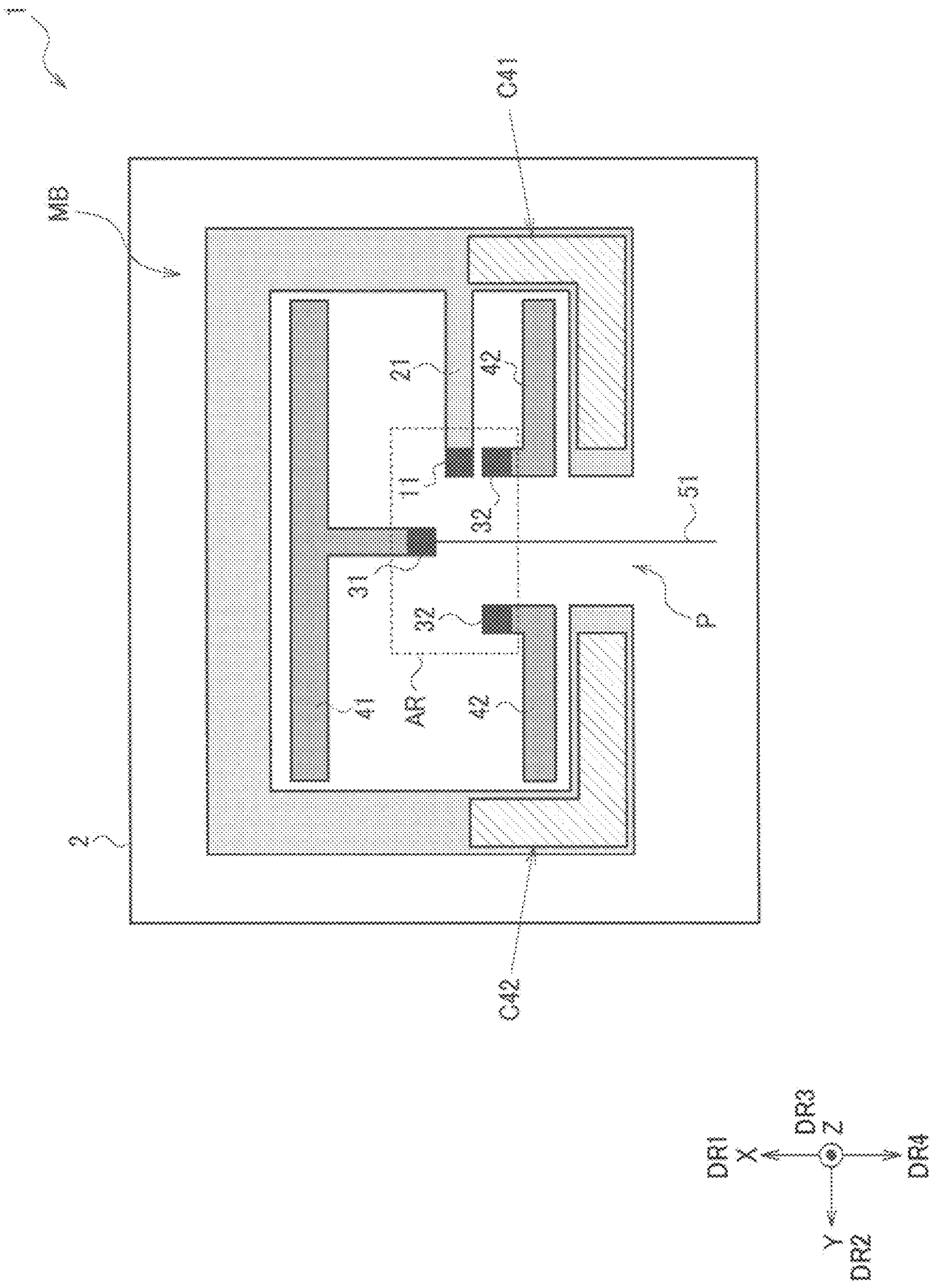
FIG. 28 is a plan view for explaining another example of the physical quantity sensor.

Further, as indicated by C31 and C32 shown in FIG. 27, it is possible to dispose predetermined groove parts at the fourth direction DR4 side of the first support beam 21 as the rotational axis of the movable body MB. The groove parts each have a shape in which the movable body MB is partially recessed. In this way, since it is possible to reduce the rotary torque of the second movable electrode unit 62, it is possible to further increase the sensitivity of the physical quantity sensor 1. It should be noted that the structures of the groove parts are not limited to those indicated by C31 and C32 shown in FIG. 27, and can arbitrarily be changed, and it is possible to adopt, for example, structures indicated by C41 and C42 shown in FIG. 28.

Figure 29:
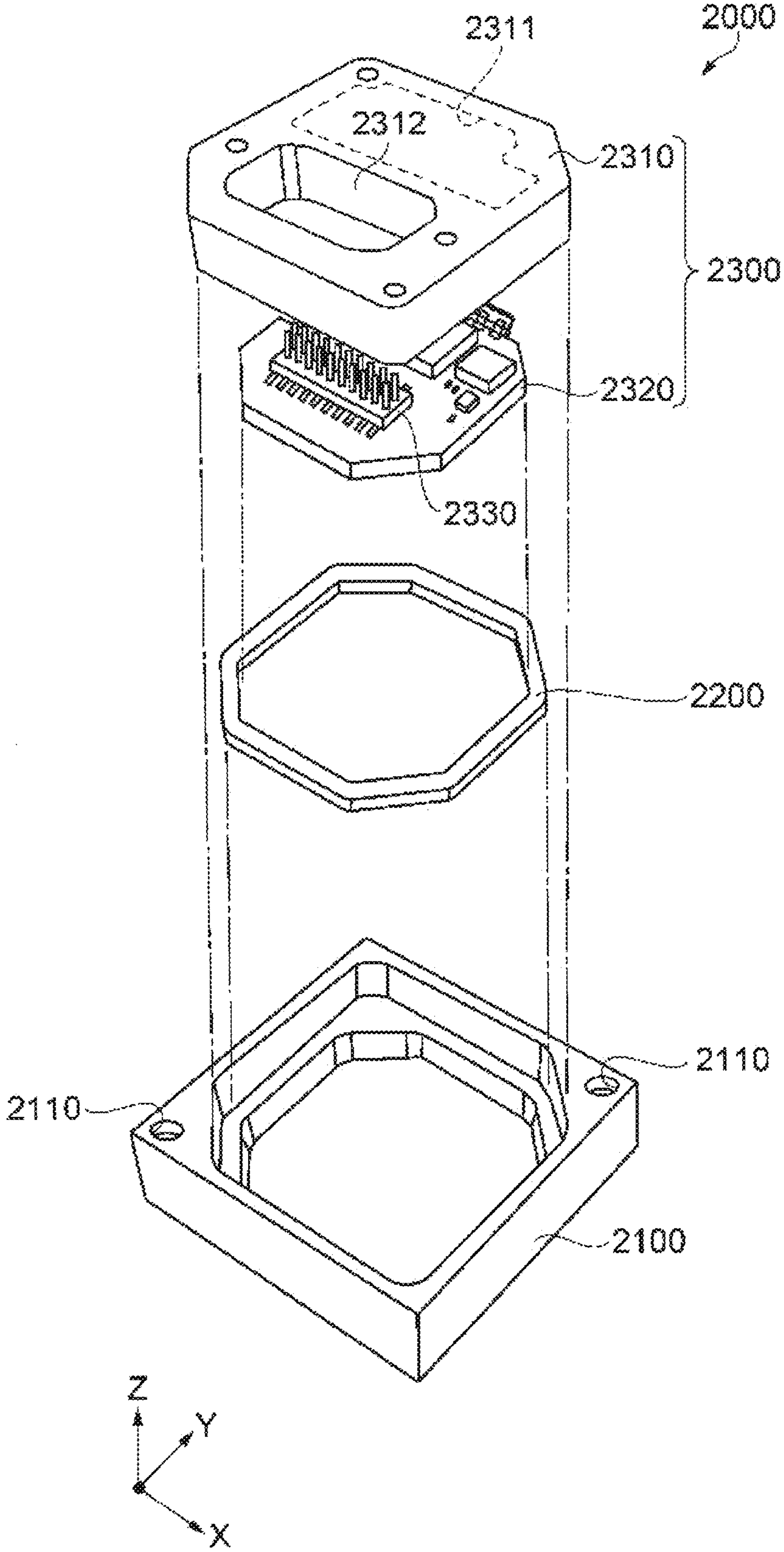
FIG. 29 is an exploded perspective view showing a schematic configuration of an inertial measurement device including the physical quantity sensor.
Figure 30:
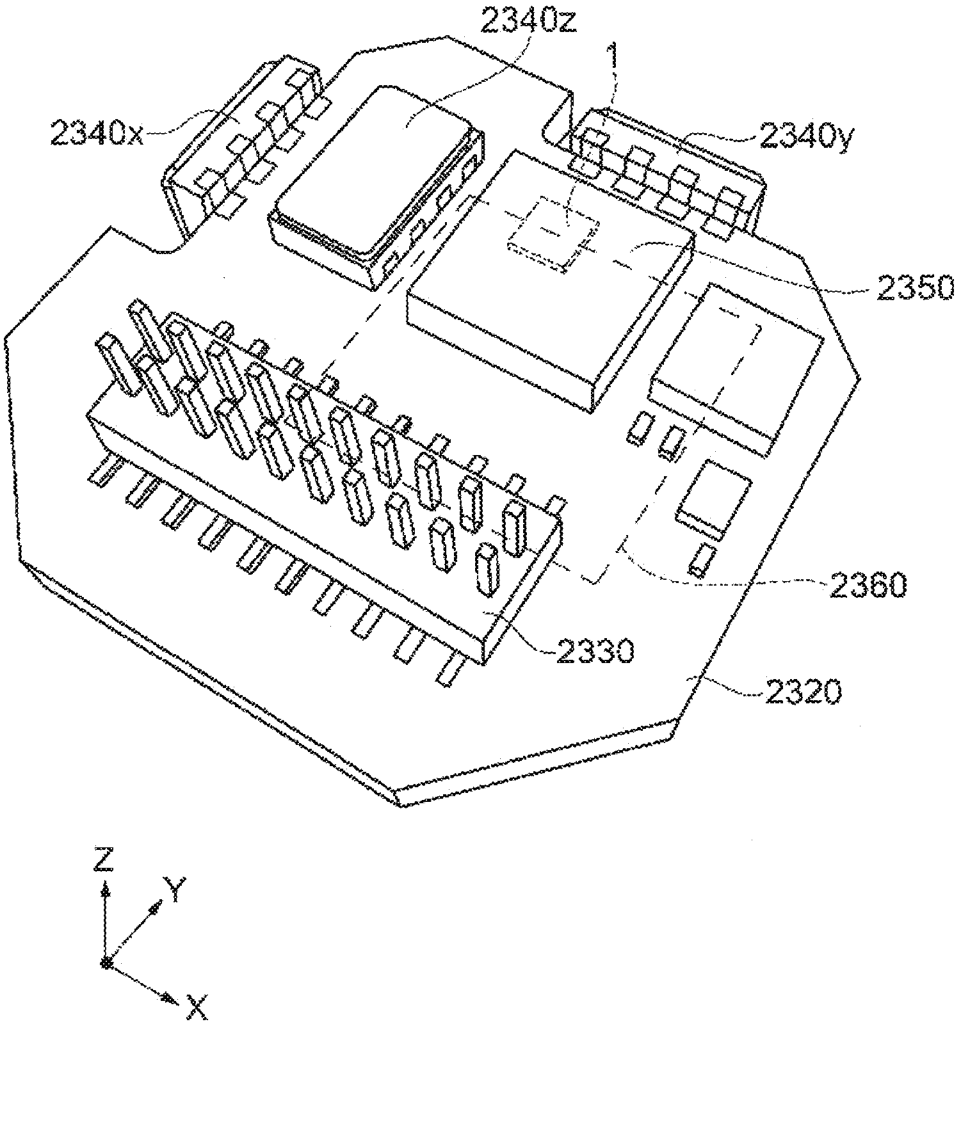
FIG. 30 is a perspective view of a circuit board of the physical quantity sensor.

Further, the method of the present embodiment can be realized by, for example, an inertial measurement device 2000 shown in FIG. 29 and FIG. 30. Specifically, the inertial measurement device 2000 according to the present embodiment includes the physical quantity sensor 1 described above, and a control IC 2360 as a controller for performing control based on a detection signal output from the physical quantity sensor 1. In this way, since an acceleration sensor unit 2350 including the physical quantity sensor 1 described above is used, it is possible to appreciate the advantages of the physical quantity sensor 1 described above, and thus, it is possible to provide the inertial measurement device 2000 capable of realizing the increase in accuracy. The inertial measurement device 2000 (IMU: Inertial Measurement Unit) is a device for detecting inertial momentum such as an attitude or a behavior of a moving body such as a car or a robot. The inertial measurement device 2000 is a so-called six-axis motion sensor provided with acceleration sensors for detecting the accelerations ax, ay, and az in respective directions along the three axes, and angular velocity sensors for detecting the angular velocities wx, wy, and wz around the three axes.

The inertial measurement device 2000 is a rectangular solid having a substantially square planer shape. Further, screw holes 2110 as mounting parts are formed in the vicinity of the two vertexes located in a diagonal direction of the square. It is possible to fix the inertial measurement device 2000 to an installation target surface of an installation target body such as a car by screwing two screws into the two screw holes 2110. It should be noted that it is also possible to reduce the inertial measurement device 2000 in size so as to be installed in, for example, a smartphone or a digital camera due to selection of the components or design changes.

The inertial measurement device 2000 has an outer case 2100, a bonding member 2200, and a sensor module 2300 to form a configuration in which the sensor module 2300 is inserted inside the outer case 2100 with an intervention of the bonding member 2200. The sensor module 2300 has an inner case 2310 and a circuit board 2320. The inner case 2310 is provided with a recess 2311 for preventing the contact with the circuit board 2320, and an opening 2312 for exposing a connector 2330 described later. Further, to the lower surface of the inner case 2310, there is bonded the circuit board 2320 via an adhesive.

As shown in FIG. 30, on an upper surface of the circuit board 2320, there are mounted the connector 2330, an angular velocity sensor 2340*z* for detecting the angular velocity around the Z axis, the acceleration sensor unit 2350 for detecting the acceleration in each of the axial directions of the X axis, the Y axis, and the Z axis, and so on. Further, on side surfaces of the circuit board 2320, there are mounted an angular velocity sensor 2340*x* for detecting the angular velocity around the X axis, and an angular velocity sensor 2340*y* for detecting the angular velocity around the Y axis.

The acceleration sensor unit 2350 includes at least one physical quantity sensor 1 for measuring the acceleration in the Z-axis direction described above, and is capable of detecting the acceleration in a single axis direction, or detecting the accelerations in biaxial directions or triaxial directions as needed. It should be noted that each of the angular velocity sensors 2340*x*, 2340*y*, and 2340*z* is not particularly limited, and it is possible to use, for example, a vibratory gyro sensor using the Coriolis force.

Further, on a lower surface of the circuit board 2320, there is mounted the control IC 2360. The control IC 2360 as a controller for performing control based on the detection signal output from the physical quantity sensor 1 is, for example, an MCU (Micro Controller Unit) incorporating a storage including a nonvolatile memory, an A/D converter, and so on, and controls each part of the inertial measurement device 2000. It should be noted that on the circuit board 2320, there is mounted a plurality of electronic components besides the above.

It should be noted that the inertial measurement device 2000 is not limited to the configuration shown in FIG. 29 and FIG. 30. For example, it is possible to adopt a configuration in which the inertial measurement device 2000 is provided with the physical quantity sensor 1 alone as the inertial sensor without providing the angular velocity sensors 2340*x*, 2340*y*, and 2340*z*. In this case, it is sufficient to realize the inertial measurement device 2000 by housing, for example, the physical quantity sensor 1 and the control IC 2360 for realizing the controller in a package as a housing container.

As described hereinabove, when defining the three directions perpendicular to each other as the first direction, the second direction, and the third direction, the physical quantity sensor according to the present embodiment detects the physical quantity in the third direction. The physical quantity sensor includes the substrate, the first fixation part, the first support beam, the movable body, the first stationary electrode fixation part, the second stationary electrode fixation part, the first stationary electrode unit, the second stationary electrode unit, and the first wiring line. The first fixation part is fixed to the substrate. The first support beam is coupled to the first fixation part at one end thereof, and extends along the second direction. The movable body is coupled to the other end of the first support beam. The first stationary electrode fixation part is fixed to the substrate. The second stationary electrode fixation part is fixed to the substrate. The first stationary electrode unit is coupled to the first stationary electrode fixation part, and is disposed at the first direction side of the first support beam. The second stationary electrode unit is coupled to the second stationary electrode fixation part, and is disposed at the fourth direction side of the first support beam, wherein the fourth direction is the opposite direction to the first direction. The first wiring line is coupled to the first stationary electrode fixation part. The movable body includes the first movable electrode unit having the movable electrode opposed to the stationary electrode of the first stationary electrode unit, and the second movable electrode unit having the movable electrode opposed to the stationary electrodes of the second stationary electrode unit. The rotary torque of the second movable electrode unit when detecting the physical quantity taking the first support beam as the rotational axis is lower than the rotary torque of the first movable electrode unit when detecting the physical quantity taking the first support beam as the rotational axis. The movable body has the opening at the fourth direction side with respect to the first support beam, and the first wiring line is extracted from the first stationary electrode fixation part to the outside of the movable body through the opening.

As described above, since the rotary torque of the second movable electrode unit is lower than the rotary torque of the first movable electrode unit, a bias in weight balance of the movable body occurs, and it becomes possible to accurately detect the physical quantity with respect to application of the acceleration or the like. Further, since the opening is provided at the fourth direction side with respect to the first support beam, it is possible to reduce the rotary torque of the second movable electrode unit, and therefore, it is possible to easily cause the bias in the weight balance of the movable body. Thus, it becomes possible to do without the bias in the weight balance of the movable body with the distance from the rotational axis, and thus, it is possible to optimize the size of the movable body. Further, since the first wiring line is extracted from the first stationary electrode fixation part to the outside of the movable body through the opening, it is possible to increase the degree of freedom in designing the first wiring line. Further, since it is possible to locate the first stationary electrode unit at the inner side of the first movable electrode unit, it is possible to reduce the size of the physical quantity sensor. Thus, it is possible to realize the physical quantity sensor which achieves both of an increase in degree of freedom in wiring and an optimization of the structure.

Further, the first stationary electrode fixation part can be arranged in the fixation part arrangement area located between the first stationary electrode unit and the second stationary electrode unit.

In this way, it is possible to suppress an influence of the warpage of the substrate which occurs in the first stationary electrode unit.

Further, the physical quantity sensor can include the second wiring line to be coupled to the second stationary electrode fixation part, the second stationary electrode fixation part can be arranged in the fixation part arrangement area, and the second wiring line can be extracted from the second stationary electrode fixation part to the outside of the movable body through the opening.

In this way, it is possible to increase the degree of freedom in designing the second wiring line, and at the same time, suppress the influence of the warpage of the substrate caused in the second stationary electrode unit by arranging the second stationary electrode fixation part in the fixation part arrangement area in addition to the first stationary electrode fixation part.

Further, the physical quantity sensor can include the third wiring line to be coupled to the first fixation part, the first fixation part can be arranged in the fixation part arrangement area, and the third wiring line can be extracted from the first fixation part to the outside of the movable body through the opening.

In this way, it is possible to increase the degree of freedom in designing the third wiring line, and at the same time, suppress the influence of the warpage of the substrate caused in the first support beam.

Further, the physical quantity sensor can include the movable electrode terminal which is coupled to the other end of the third wiring line, and which is disposed outside the movable body.

In this way, it is possible to couple the third wiring line extracted to the outside of the movable body to the external apparatus or the like.

Further, the physical quantity sensor can include the second fixation part to be fixed to the substrate, the second support beam which is coupled to the second fixation part at one end, and the other end of which is coupled to the movable body, and the fourth wiring line to be coupled to the second fixation part, the second fixation part can be arranged in the fixation part arrangement area, and the fourth wiring line can be extracted from the second fixation part to the outside of the movable body through the opening.

In this way, it is possible to increase the degree of freedom in designing the fourth wiring line, and at the same time, suppress the influence of the warpage of the substrate caused in the second support beam.

Further, the physical quantity sensor can include the first stationary electrode terminal which is coupled to the other end of the first wiring line, and which is disposed outside the movable body.

In this way, it is possible to couple the first wiring line which is extracted to the outside of the movable body from the first stationary electrode unit located inside the movable body, to the external apparatus or the like while optimizing the structure of the physical quantity sensor.

Further, the movable body can include the first coupler, the first base, and the second base. The first coupler is coupled to the other end of the first support beam, and extends along the first direction. The first base is disposed at the first direction side of the first support beam, coupled to the first coupler, and extends along the second direction, and is provided with the movable electrode of the first movable electrode unit. The second base is disposed at the fourth direction side of the first support beam, coupled to the first coupler, and extends along the second direction, and is provided with the movable electrode of the second movable electrode unit.

In this way, it is possible to make the first base function as the first movable electrode unit, and at the same time, it is possible to make the second base function as the second movable electrode unit.

Further, the movable electrode of the first movable electrode unit can extend from the first base along the fourth direction, and can be opposed to the stationary electrode of the first stationary electrode unit in the second direction, and the movable electrode of the second movable electrode unit can extend from the second base along the first direction, and can be opposed to the stationary electrode of the second stationary electrode unit in the second direction.

In this way, it is possible to increase the area of the movable electrode of the first movable electrode unit opposed to the stationary electrode of the first stationary electrode unit. Similarly, it is possible to increase the area of the movable electrode of the second movable electrode unit opposed to the stationary electrode of the second stationary electrode unit.

Further, the movable body can include the third base which is disposed at the fourth direction side of the first base, coupled to the first coupler, and extends along the second direction, and is provided with the movable electrode of the first movable electrode unit.

In this way, it is possible to increase the rotary torque of the first movable electrode unit. Thus, it is possible to make the physical quantity sensor higher in sensitivity.

Further, the movable electrode of the first movable electrode unit can extend from the third base along the first direction, and can be opposed to the stationary electrode of the first stationary electrode unit in the second direction.

In this way, it is possible to further increase the area of the movable electrode of the first movable electrode unit opposed to the stationary electrode of the first stationary electrode unit.

Further, the physical quantity sensor can include the second fixation part to be fixed to the substrate and the second support beam one end of which is coupled to the second fixation part, and the other end of which is coupled to the movable body, the movable body can include the first coupler, the second coupler, the first base, the second base, the fourth base, and the fifth base, and the opening of the movable body can be disposed between the second base and the fifth base. The first coupler is coupled to the other end of the first support beam, and extends along the first direction. The second coupler is coupled to the other end of the second support beam, and extends along the first direction. The first base is disposed at the first direction side of the first support beam, coupled to the first coupler, and extends along the second direction, and is provided with the movable electrode of the first movable electrode unit. The second base is disposed at the fourth direction side of the first support beam, coupled to the first coupler, and extends along the second direction, and is provided with the movable electrode of the second movable electrode unit. The fourth base is disposed at the first direction side of the second support beam, coupled to the second coupler, and extends along the second direction, and is provided with the movable electrode of the first movable electrode unit. The fifth base is disposed at the fourth direction side of the second support beam, coupled to the second coupler, and extends along the second direction, and is provided with the movable electrode of the second movable electrode unit.

In this way, it is possible to form the movable body in which the fourth base and the fifth base are coupled to the second support beam via the second coupler, make the fourth base function as the first movable electrode unit, and make the fifth base function as the second movable electrode unit.

Further, the inertial measurement device according to the present embodiment includes the physical quantity sensor described above, and the controller for performing the control based on the detection signal output from the physical quantity sensor.

It should be noted that although the present embodiment is hereinabove described in detail, it should easily be understood by those skilled in the art that it is possible to make a variety of modifications not substantially departing from the novel matters and the advantages of the present disclosure. Therefore, all of such modified examples should be included in the scope of the present disclosure. For example, a term described at least once with a different term having a broader sense or the same meaning in the specification or the accompanying drawings can be replaced with the different term in any part of the specification or the accompanying drawings. Further, all of the combinations of the present embodiment and the modified examples are also included in the scope of the present disclosure. Further, the configurations and the operations of the physical quantity sensor, the inertial measurement device, and so on are not limited to those explained in the present embodiment, but can be implemented with a variety of modifications.

What is claimed is:

1. A physical quantity sensor configured to detect a physical quantity in a third direction when defining three directions perpendicular to each other as a first direction, a second direction, and the third direction, the physical quantity sensor comprising:

- a substrate;
- a movable body that is rectangular-frame-shaped, the movable body having:
  - first and second sides opposite to each other along the first direction and extending along the second direction;
  - third and fourth sides opposite to each other along the second direction and extending along the first direction;
  - an opening in a first intermediate position of the second side;
  - a first support beam extending from a second intermediate position of the third side along the second direction;
  - a first fixation part at an end of the first support beam, the first fixation part being fixed to the substrate;
- a first stationary electrode unit provided directly adjacent to the first side of the movable body and extending along the second direction, an end of the first stationary electrode unit having a first stationary electrode fixation part fixed to the substrate;
- a second stationary electrode unit provided directly adjacent to the second side of the movable body and extending along the second direction, an end of the second stationary electrode unit having a second stationary electrode fixation part fixed to the substrate; and a first wiring line extending from an outside of the movable body to the first stationary electrode fixation part via the opening in a plan view, one end of the first wiring line being coupled to the first stationary electrode fixation part, wherein the movable body includes:

a first movable electrode unit at the first side, the first movable electrode unit having a first movable electrode opposed to a first stationary electrode of the first stationary electrode unit; and a second movable electrode unit at the second side, the second movable electrode unit having a second movable electrode opposed to a second stationary electrode of the second stationary electrode unit, and a rotary torque of the second movable electrode unit when detecting the physical quantity taking the first support beam as a rotational axis is lower than a rotary torque of the first movable electrode unit when detecting the physical quantity taking the first support beam as the rotational axis.

2. The physical quantity sensor according to claim 1, wherein the first stationary electrode fixation part is arranged in a fixation part arrangement area between the first stationary electrode unit and the second stationary electrode unit.

3. The physical quantity sensor according to claim 2, further comprising:

a second wiring line coupled to the second stationary electrode fixation part, wherein the second stationary electrode fixation part is arranged in the fixation part arrangement area, and the second wiring line is extracted from the second stationary electrode fixation part to the outside of the movable body via the opening in the plan view.

4. The physical quantity sensor according to claim 2, further comprising:

a third wiring line, one end of the third wiring line being coupled to the first fixation part, wherein the first fixation part is arranged in the fixation part arrangement area, and the third wiring line is extracted from the first fixation part to the outside of the movable body via the opening in the plan view.

5. The physical quantity sensor according to claim 4, further comprising:

a movable electrode terminal which is coupled to the other end of the third wiring line, and which is disposed outside the movable body.

6. The physical quantity sensor according to claim 2, further comprising:

a second support beam extending from a third intermediate position of the fourth side along the second direction;

a second fixation part at an end of the second support beam, the second fixation part being fixed to the substrate; and a fourth wiring line, one end of the fourth wiring line being coupled to the second fixation part, wherein the second fixation part is arranged in the fixation part arrangement area, and the fourth wiring line is extracted from the second fixation part to the outside of the movable body via the opening in the plan view.

7. The physical quantity sensor according to claim 1, further comprising:

a first stationary electrode terminal which is coupled to the other end of the first wiring line, and which is disposed outside the movable body.

8. An inertial measurement device comprising:

the physical quantity sensor according to claim 1; and a controller configured to perform control based on a detection signal output from the physical quantity sensor.

* * * * *